(12) United States Patent
Lange

(10) Patent No.: US 10,540,674 B2
(45) Date of Patent: Jan. 21, 2020

(54) SYSTEMS AND METHODS FOR ADMINISTRATION OF FINANCIAL PRODUCTS

(71) Applicant: Jeffrey S. Lange, Chicago, IL (US)

(72) Inventor: Jeffrey S. Lange, Chicago, IL (US)

(73) Assignee: GROUP ONE THOUSAND ONE, LLC, Indianapolis, IN (US)

( * ) Notice: Subject to any disclaimer, the term of this patent is extended or adjusted under 35 U.S.C. 154(b) by 430 days.

(21) Appl. No.: 13/841,900

(22) Filed: Mar. 15, 2013

(65) Prior Publication Data

US 2013/0304558 A1 Nov. 14, 2013

Related U.S. Application Data

(60) Provisional application No. 61/645,749, filed on May 11, 2012.

(51) Int. Cl.
G06Q 30/02 (2012.01)
(52) U.S. Cl.
CPC ..... *G06Q 30/0226* (2013.01); *G06Q 30/0239* (2013.01)
(58) Field of Classification Search
CPC .......................... G06Q 30/02; G06Q 30/0226
See application file for complete search history.

(56) References Cited

U.S. PATENT DOCUMENTS

| 6,243,688 B1 | 6/2001 | Kalina | |
| 8,458,016 B1 * | 6/2013 | Medina, III | G06Q 30/02 705/14.31 |
| 2002/0062249 A1 * | 5/2002 | Iannacci | G06Q 20/10 705/14.1 |

(Continued)

FOREIGN PATENT DOCUMENTS

WO    WO 01/84280 A2    11/2001

OTHER PUBLICATIONS

International Search Report and Written Opinion, Appl. No. PCT/US2013/040617, dated Oct. 8, 2013.
Security Benefit Advisor Variable Annuity, Issued by Security Benefit Life Insurance Company, Supplement Dated Mar. 11, 2005 to Current Prospectus Dated May 1, 2004.

* cited by examiner

*Primary Examiner* — Scott D Gartland
*Assistant Examiner* — Christopher B Tokarczyk
(74) *Attorney, Agent, or Firm* — Winston & Strawn LLP

(57) ABSTRACT

The principles and embodiments of the invention relate to systems and computer-implemented methods for administering financial product accounts that provide reward benefits. An attribution rate on an investment in a financial account can be generated as benefit rewards received from the use of credit cards in a credit card account. The method can comprise issuing credit cards to customers, and receiving invested funds into corresponding financial accounts for each customer, wherein the financial accounts are configured by the computer-implemented method as a saving vehicle selected by the customers for investment. The computer-implemented administration system can comprise a credit or debit card provided to a person having an account, a first computer system having communication hardware for receiving credit or debit card data over a network, and a non-transitory computer readable media having an account database configured to record monetary values in the account.

12 Claims, 13 Drawing Sheets

(56) References Cited

U.S. PATENT DOCUMENTS

| | | | |
|---|---|---|---|
| 2007/0005497 A1* | 1/2007 | Sullivan | G06Q 20/10 705/41 |
| 2007/0094114 A1* | 4/2007 | Bufford | G06Q 30/02 705/35 |
| 2007/0106581 A1 | 5/2007 | Mitchell et al. | |
| 2007/0174169 A1 | 7/2007 | Robbins | |
| 2011/0131097 A1* | 6/2011 | Taylor | G06Q 20/10 705/14.66 |
| 2011/0145170 A1* | 6/2011 | Carlson | G06Q 40/00 705/36 R |
| 2012/0116857 A1 | 5/2012 | Deguchi et al. | |

| EOY YEAR | AV | RAV | F(T) | C(T) | R(T) | S(T) | CB ON AV | CB ON RAV | TOTAL CB |
|---|---|---|---|---|---|---|---|---|---|
| 0 | $ 100,000 | | | | | | | | |
| 1 | $ 101,000 | $ 25,000 | 0.1 | 0.2 | 0.005 | 0.005 | $ 51 | $ 25 | $ 76 |
| 2 | $ 102,010 | $ 50,250 | 0.105 | 0.201 | 0.01 | 0.01 | $ 107 | $ 101 | $ 208 |
| 3 | $ 103,030 | $ 75,753 | 0.11 | 0.202 | 0.015 | 0.015 | $ 170 | $ 230 | $ 400 |
| 4 | $ 104,060 | $ 101,510 | 0.115 | 0.203 | 0.02 | 0.02 | $ 239 | $ 412 | $ 651 |
| 5 | $ 105,101 | $ 127,525 | 0.12 | 0.204 | 0.025 | 0.025 | $ 315 | $ 650 | $ 966 |
| 6 | $ 106,152 | $ 153,800 | 0.125 | 0.205 | 0.03 | 0.03 | $ 398 | $ 946 | $ 1,344 |
| 7 | $ 107,214 | $ 180,338 | 0.13 | 0.206 | 0.035 | 0.035 | $ 488 | $ 1,300 | $ 1,788 |
| 8 | $ 108,286 | $ 207,142 | 0.135 | 0.207 | 0.04 | 0.04 | $ 585 | $ 1,715 | $ 2,300 |
| 9 | $ 109,369 | $ 234,213 | 0.14 | 0.208 | 0.045 | 0.045 | $ 689 | $ 2,192 | $ 2,881 |
| 10 | $ 110,462 | $ 261,555 | 0.145 | 0.209 | 0.05 | 0.05 | $ 801 | $ 2,733 | $ 3,534 |
| 11 | $ 111,567 | $ 289,171 | 0.15 | 0.21 | 0.055 | 0.055 | $ 920 | $ 3,340 | $ 4,260 |
| 12 | $ 112,683 | $ 317,063 | 0.155 | 0.211 | 0.06 | 0.06 | $ 1,048 | $ 4,014 | $ 5,062 |
| 13 | $ 113,809 | $ 345,233 | 0.16 | 0.212 | 0.065 | 0.065 | $ 1,184 | $ 4,757 | $ 5,941 |
| 14 | $ 114,947 | $ 373,686 | 0.165 | 0.213 | 0.07 | 0.07 | $ 1,328 | $ 5,572 | $ 6,899 |
| 15 | $ 116,097 | $ 402,422 | 0.17 | 0.214 | 0.075 | 0.075 | $ 1,480 | $ 6,459 | $ 7,939 |
| 16 | $ 117,258 | $ 431,447 | 0.175 | 0.215 | 0.08 | 0.08 | $ 1,642 | $ 7,421 | $ 9,062 |
| 17 | $ 118,430 | $ 460,761 | 0.18 | 0.216 | 0.085 | 0.085 | $ 1,812 | $ 8,460 | $ 10,272 |
| 18 | $ 119,615 | $ 490,369 | 0.185 | 0.217 | 0.09 | 0.09 | $ 1,992 | $ 9,577 | $ 11,568 |
| 19 | $ 120,811 | $ 520,272 | 0.19 | 0.218 | 0.095 | 0.095 | $ 2,181 | $ 10,775 | $ 12,955 |
| 20 | $ 122,019 | $ 550,475 | 0.195 | 0.219 | 0.1 | 0.1 | $ 2,379 | $ 12,055 | $ 14,435 |

| CR | CR + CB | PRE TAX CF | PRE TAX COF | REBATES | AT ANNUITY | AT CASH FLOWS | AT IRR |
|---|---|---|---|---|---|---|---|
| | | | 4.72% | | | | 4.501% |
| $ 1,000 | $ 1,076 | $ (100,000.0) | | $ - | | $ (100,000.00) | |
| $ 1,010 | $ 1,218 | $ 76 | | $ 76 | | $ 75.50 | |
| $ 1,020 | $ 1,420 | $ 208 | | $ 208 | | $ 208.11 | |
| $ 1,030 | $ 1,682 | $ 400 | | $ 400 | | $ 399.53 | |
| $ 1,041 | $ 2,006 | $ 651 | | $ 651 | | $ 651.47 | |
| $ 1,051 | $ 2,395 | $ 966 | | $ 966 | | $ 965.68 | |
| $ 1,062 | $ 2,850 | $ 1,344 | | $ 1,344 | | $ 1,343.94 | |
| $ 1,072 | $ 3,372 | $ 1,788 | | $ 1,788 | | $ 1,788.06 | |
| $ 1,083 | $ 3,964 | $ 2,300 | | $ 2,300 | | $ 2,299.88 | |
| $ 1,094 | $ 4,628 | $ 2,881 | | $ 2,881 | | $ 2,881.26 | |
| $ 1,105 | $ 5,365 | $ 3,534 | | $ 3,534 | | $ 3,534.10 | |
| $ 1,116 | $ 6,178 | $ 4,260 | | $ 4,260 | | $ 4,260.35 | |
| $ 1,127 | $ 7,068 | $ 5,062 | | $ 5,062 | | $ 5,061.96 | |
| $ 1,138 | $ 8,037 | $ 5,941 | | $ 5,941 | | $ 5,940.93 | |
| $ 1,149 | $ 9,089 | $ 6,899 | | $ 6,899 | | $ 6,899.29 | |
| $ 1,161 | $ 10,223 | $ 7,939 | | $ 7,939 | | $ 7,939.11 | |
| $ 1,173 | $ 11,444 | $ 9,062 | | $ 9,062 | | $ 9,062.49 | |
| $ 1,184 | $ 12,753 | $ 10,272 | | $ 10,272 | | $ 10,271.56 | |
| $ 1,196 | $ 14,152 | $ 11,568 | | $ 11,568 | | $ 11,568.49 | |
| $ 1,208 | $ 15,643 | $ 12,955 | | $ 12,955 | | $ 12,955.48 | |
| | | $ 136,454 | | $ 14,435 | $ 13,211.40 | $ 127,646.18 | |

FIG. 10B

SYSTEMS AND METHODS FOR ADMINISTRATION OF FINANCIAL PRODUCTS

CROSS-REFERENCE TO RELATED APPLICATIONS

This application claims the benefit of U.S. Provisional Application No. 61/645,749, filed on May 11, 2012, the disclosure of which is expressly incorporated herein by reference thereto.

BACKGROUND OF THE INVENTION

Field of the Invention

The subject disclosure relates to methods and systems for creating, offering, and administering financial products such as annuities, life insurance, and other policies issued by life insurance companies.

Background of the Related Art

In general, investment products directed to implementing a savings vehicle for consumers have had a number of drawbacks. For example, these products are typically specialized savings products which are acquired and administered by companies and systems that are distinct (at least from the consumer's perspective) from the everyday financial tools the general public is comfortable with, such as credit cards or bank accounts. As such, persuading consumers to sign up for these savings vehicles can involve challenges in familiarizing consumers with the products, integrating the products with consumers' everyday lives (and the related computer administration of the products and related services), and connecting with consumers through different marketing channels. Existing systems are also deficient in providing financial products that promote customers to save by participating in an investment product and also provide additional spending capability to consumers in connection with the saved principal. Investment products oftentimes "lock up" the invested capital, for example, for the purpose of accumulation. In such products, the saved principal in the financial account will likely have restrictions on the ability to withdraw from the investment or may include withdrawal surcharges.

One industry example demonstrating deficiencies in the prior art are retirement products offered by the life insurance industry. Retirement products offered by the life insurance industry, typically in the form of deferred or immediate annuities, attempt to provide the policyholder tax-preferred accumulation of assets which can then, at the option of the policyholder, be used to convert to a tax-preferred income stream that the policyholder may not outlive.

Deferred annuities are typically designed by the industry to have an accumulation phase followed by an optional annuitization phase. During the accumulation phase, interest is credited to the policyholder's account value and these credits are not currently taxed. In exchange for not being currently taxed the policyholder is penalized for early terminations or surrenders—typically in the form of a significant surrender charge imposed by the issuing company, and by the IRS in the form of a 10% penalty tax in addition to the ordinary income tax rate on any earnings in excess of the policyholder's basis in the annuity, should the earnings be withdrawn prior to the policy owner attaining age 59½. Accumulation earnings are taxed using ordinary tax rates which can approach 50% at the state, federal and local (if applicable) level—upon any withdrawal. If the accumulation amounts are used instead to fund a lifelong stream of annuitization payments, the earnings in excess of basis are still taxed at ordinary rates, with an amount allocated to principal which is excluded each year. Effectively, then, annuities provide tax benefits which amount to "deferred ordinary" treatment on any earnings. This is similar, but not identical to, qualified retirement accounts such as 401(k)s, which also provide for deferred ordinary tax treatment of earnings.

The amount of tax efficiency provided by deferred ordinary treatment on earnings is not very significant—even over relatively long periods—and this can be a major flaw in the current products offered by the life insurance industry. For example, consider a policyholder who pays state, local, and federal tax at a combined 40% ordinary marginal rate. Assume the policyholder chooses between holding an annuity for 20 years and then withdrawing the proceeds versus holding an account which is currently taxable. Assuming a pre-tax interest rate of 5% on both products, the taxable account obviously produces an after-tax yield of 3% (tax is 40% of 5%, or 2%, or 200 basis points). In the annuity case, the accumulation at 5% for 20 years results in an amount of gains of 1.65 per dollar invested. The 1.65 is taxed at ordinary rates, leaving the policyholder with after-tax proceeds, including basis, of 1.992 units per dollar invested, for an annualized after-tax return of 3.51%. Thus the annuity has provided a 51-basis-point "pickup" in after-tax yield compared to the taxable account (3.51% for the annuity with deferred ordinary treatment assuming no 10% penalty, versus 3% for the currently taxable account example). While not completely insignificant, the tax benefit of 51 basis points reflects the limited nature of deferring ordinary taxation. At the same time, the policyholder must forego liquidity at the risk of paying tax penalties and surrender charges. In particular, the surrender charges result from the need of life insurance companies to pay sizeable commissions to agents to sell annuity products, ironically, in part, due to the small pickup in benefits at the expense of multi-year illiquidity.

In the life insurance industry example, as mentioned above, the prior art is lacking due to the failure of providing real purchasing or consumption power protection during the accumulation phase so that consumption derived from annuitization dollars are not eroded due to inflation—both expected and unexpected—operating over long periods of time and due to unfavorable taxation. Thus, current state of the art annuity products provide inferior after-tax and after-inflation returns, i.e., after-tax real returns, which are the primary risk-adjusted quantities that matter for deferred consumption, are inferior in the current art.

Also, to the extent current-art annuities underperform on a real after-tax basis, they impose risk on policyholders that their lifetime consumption during annuitization will be lowered or will not provide the longevity protection that annuitization is exactly designed to provide.

At least one new product to achieve the objectives of superior (1) after-tax, (2) after-inflation, and (3) lifetime consumption is needed.

Other deficiencies may also exist in existing products and related systems and methods that would be evident to those of ordinary skill in the art.

SUMMARY OF THE INVENTION

In accordance with the principles of the present invention, methods and systems may be provided for administering financial product accounts that provide reward benefits.

The principles and embodiments of the invention relate to a computer-implemented method of administering financial products that generate value in the form of benefit rewards received from the use of credit cards. The method can comprise issuing financial transaction credit cards to customers, and receiving data indicating investment of funds by customers into corresponding financial accounts for each customer, wherein the financial accounts are configured by the computer-implemented method as a saving vehicle selected by the customers for investment. The transaction information may be received from one or more remote computer systems, where the information may comprise credit card transaction information that is received in response to the use of the issued credit cards by customers when the customers spend available credit on their corresponding cards. The method can further comprise processing the received transaction information and one or more structural characteristics underlying the financial accounts and in response generating one or more outputs representing current reward benefits that presently accrue to the customers that provide additional spending resources to the customers, wherein the processing comprises generating the amount of reward benefits as a form of value received upon spending by customers from the customers' use of their credit cards, and wherein the processing implements a model that quantifies a predetermined value attribution rate specified for the financial account by issuing benefit rewards for the customers' consumption in response to the customers' use of their credit cards. The method may also comprise transmitting information communicating the reward benefits currently available for consumption by customers. The financial accounts may be annuities, life insurance policies and/or accounts, such as mutual funds, brokerage and other accounts which administer, custody and service financial assets of customers.

The computer-implemented method may further comprise crediting the first financial account at a predetermined interest rate that is at or above a minimum allowable interest, e.g., it could be set at a level lower than the average rate credited on similar products and which will not fall below the minimum allowable interest rate under state laws, and storing the new amount of the first financial account in a database.

The computer-implemented method may also further comprise determining a maximum reward amount available during a specific time period, as a percentage of the amount of funds in the financial account, wherein the maximum amount of rewards may be calculated at the start of a fiscal or calendar year, and wherein the reward amount is subtracted from the maximum reward amount to determine a remaining reward amount. The maximum reward amount for a specific time period may include all or a portion of remaining reward amounts rolled over from previous time periods.

The percentage used to determine the maximum reward amount available during a specific time period can also increase as a function of time that the customer maintains the financial account, thereby providing an increasing maximum reward amount over time, where the time period may be, for example, a month, a calendar year, or a fiscal year.

The computer-implemented method may further comprise discontinuing crediting a reward amount to the reward account when the remaining reward amount reaches zero.

The computer-implemented method may also comprise associating one or more additional third-party financial accounts with the financial transaction card, determining the total account value of the one or more additional third-party financial accounts, and determining a percentage of the total of all third-party financial accounts to be eligible for reward amounts through use of the credit or debit card in making a purchase. The percentage of the total of all third-party financial accounts to be eligible for reward amounts may be combined with the percentage of the amount of funds in the financial account eligible for reward amounts to increase the maximum reward amount available during a specific time period.

Principles and embodiments of the invention also relate to optionally diversifying the risk of payment on an accrued reward by transferring all or part of the risk of default on the payment of the rewards to a surety company for a fee, wherein the surety company may provide an unsecured guarantee of any unreimbursed rewards accrued by the one or more customers through use of their credit cards.

Principles and embodiments of the invention also relate to a computer implemented method of accumulating value in a tax deferred account from the use of an associated debit or credit card, which comprises creating a tax deferred account for a customer in a non-transient computer memory, depositing a principal amount in the tax deferred account and recording the amount in the computer memory, providing a debit or credit card to the customer that is associated with the tax deferred account, specifying a predetermined time period within which a percentage of the amount purchased using the credit or debit card is credited to the customer as a reward, wherein the time period is a calendar year or a fiscal year, receiving data at a computer system when the customer's debit or credit card is used to make purchases, wherein the data includes the amount of the purchase, crediting a percentage of the purchase amount to the customer as an accrued value, and storing the credited amount in the computer memory, tracking the amount purchased using the credit or debit card against the total amount available as a reward for purchases, determining a remaining amount available for purchases by subtracting the credited amount from a predetermined available amount established for the time period, and preventing the crediting of a percentage of the purchase amount to the principal amount of the tax-deferred account when the amount purchased using the credit or debit card exceeds the total amount available for purchases in a predetermined time period.

The method can further comprise providing a surety on payments to the customer for the accrued value of their rewards for a period of time between the time a reward is credited to the customer as a percentage of the amount purchased using the credit or debit card and the time the customer is reimbursed, and transmitting at least a portion of the amount of the accrued value of the reward to the surety company, which may include payment of a surety fee, to receive a guarantee of at least part of the payment on the accrued value until the customer receives the full amount of the accrued reward. The risk for payment on the customer's reward amount for default is thereby split between the institution holding the financial account and the surety company.

The value of the rewards accrued by one or more customers may be communicated to the one or more surety companies for storage in a database to track a current amount of risk guaranteed, and to periodically update a record of the received fees and amount of guaranteed risk. The surety company may process the data on a current amount of guaranteed reward risk to calculate an amount of fees for the risk coverage, and communicate to the insurance company the amount of currently owed fees.

The method can further comprise establishing a credit rate at the time the tax-deferred account is created for the customer; determining an interest amount to be credited to the tax-deferred account by multiplying the principal amount in the tax deferred account by the established credit rate for the predetermined time period, combining the interest amount with the principal amount, and recording the combined amount in the computer memory configured to store amount values of the account, wherein the combined amount replaces the previously recorded principal amount as a new principal amount. The percentage of the combined amount in the tax-deferred account that is available for rewards can be a function of time, wherein the available percentage increases with time to provide increasing rewards to the customer for the longevity and fidelity of the tax-deferred account with a financial institution administering the tax-deferred account and/or credit cards.

The method may further comprise identifying additional tax-deferred accounts created by one or more third parties based upon a referral by the customer, recording a principal amount deposited in the additional tax-deferred accounts in the computer memory, and adding a percentage of the total amount of principal deposited in the additional tax-deferred accounts to the value of total amount available for purchases within the predetermined period, wherein the percentage of the total amount of principal deposited in the additional tax-deferred accounts is the product of an account value percentage and a reward percentage. The account value percentage may also be a portion of the additional tax-deferred account values and the reward percentage is the portion of the eligible portion of the tax-deferred account values.

The principles and embodiments of the invention may also relate to a computer-implemented administration system for providing reward accumulation to an accumulation account through a credit or debit card associated with an annuity account, which comprises a credit or debit card provided to a person having a valid annuity account having a non-zero balance, a first computer system comprising communication hardware configured to receive data over a network regarding the use of the credit or debit card in making a purchase, and transmitting data regarding the accumulation account to the person having the annuity account, a non-transitory computer readable media having an account database configured to record a monetary value deposited into an annuity account created by the person issued the credit or debit card, a value for one or more third-party accounts associated with the annuity account created by the person, and a value accumulated in the accumulation account through use of the credit or debit card, a processor configured to process computer instruction codes for carrying out the steps of: storing the monetary value deposited into an annuity account in the database, determining an interest amount to be credited to the person's account based on a defined interest rate applied over a predetermined period, wherein the interest rate is at or above a minimum allowable interest rate under state laws, determining a percentage of the annuity account to be eligible for reward amounts through use of the credit or debit card in making a purchase, identifying third-party accounts to be associated with the annuity account through referral by the person that created the annuity account, calculating a total of all third-party accounts associated with the annuity, storing the total of all third-party accounts associated with the annuity account in the database, determining a percentage of the total of all third-party accounts to be eligible for reward amounts through use of the credit or debit card in making a purchase, combining the percentage of the total of all third-party accounts to be eligible for reward with the percentage of the annuity account to be eligible for reward amounts, and storing the total eligible amount in the database, determining the amount that was used for a purchase with the credit or debit card, and subtracting the amount from the total eligible for reward, crediting a reward amount to the accumulation account, and storing the new accumulation account value in the database, and transmitting data about the accumulation account to the person over a network. The data about the annuity account may include the amount awarded to the customer in the form of rewards on the credit card for purchases. Rewards may be a merchant discount which could include points credited to the credit card, rebates on the price of purchases (e.g., coupons), and/or cash back to the customer. The award of such points and rebates may be in the same form as conventional credit card reward programs. The value attribution rate under the rewards program will preferably be higher than the rate available from the interchange fees. The interchange fees could, if desired in some embodiments, be used to fund a portion of the rewards program but an additional component would also be required to sufficiently fund the higher value attribution rate. The administration system may also have the database further configured to record a percentage of the annuity account to be eligible for reward amounts.

Embodiments of the invention have been described in reference to annuities, however the inventive features of these embodiments can be applied to other financial accounts, for example, life insurance policies, qualified retirement accounts, deferred-tax accounts, mutual funds, and other accounts having custody of a customer's assets, which are considered within the scope of the invention.

Embodiments of the administration system may have the communication hardware further configured to receive a current Consumer Price Index value over a network from a remote computer system, and the processor of the first computer system carries out the additional steps of adjusting the reward percentage applicable to transactions using the credit or debit card based on the current Consumer Price Index value.

Embodiments of the administration system may also have the communication hardware further configured to receive data regarding the amount that was used for a purchase with the credit or debit card from a second computer system.

The principles and embodiments of the invention also relate to systems and apparatus comprising the necessary electronics that can be configured to perform the method and process steps described herein. The electronic systems and apparatus can comprise random access memory ("RAM"), and non-transient computer-readable media that may be permanent and/or semi-permanent memory, such as hard drives, complementary metal oxide semiconductor (CMOS) memory, and flash memory or electrically-erasable, programmable, read-only memory (EEPROM). The electronic systems and apparatus can also comprise processor(s) that can read the instructions from a computer-readable medium and cause the electronic systems and apparatus to perform the steps of the different embodiments of the invention and to carry out any one of the methods disclosed herein. The electronic systems and apparatus can also comprise the electronics necessary for communication over a telephone or computer network as would be known in the art.

The steps of the computer-implemented methods described herein may be written to or otherwise stored on a non-transient computer-readable medium as computer instruction codes and/or data. A computer-readable medium such as a floppy disk, CD-ROM, DVD, etc., may thereby be used to store the processes, techniques, and information illustratively described herein.

The steps described herein may be performed in different combinations or in different sequences as appropriate. The steps may also be combined with other processes, steps, or systems illustratively described herein. Each and every one of these permutations and combinations is separately deemed to be an embodiment herein in its own right. It is therefore intended that all of these embodiments, examples, variations, and modifications thereon are meant to be encompassed within the spirit and scope of the present invention as set forth in the following claims.

It should be appreciated that the subject technology can be implemented and utilized in numerous ways, including without limitation as a process, an apparatus, a system, a device, a method for applications now known and later developed, or a computer-readable medium. These and other unique features of the system disclosed herein will become more readily apparent from the following description and the accompanying drawings. The system is also applicable to other types of accounts which store value and credit interest or provide investment returns.

BRIEF DESCRIPTION OF THE DRAWINGS

Further features of this invention, its nature, and various advantages will become more apparent upon consideration of the following detailed description, taken in conjunction with the accompanying drawings, in which like reference characters refer to like parts throughout, and in which:

FIGS. 10A and B together make up a table that illustrates an operation of one or more computer systems implementing a debit card and annuity financial product in accordance with one embodiment of the present invention.

DETAILED DESCRIPTION OF THE INVENTION

Figure 1:
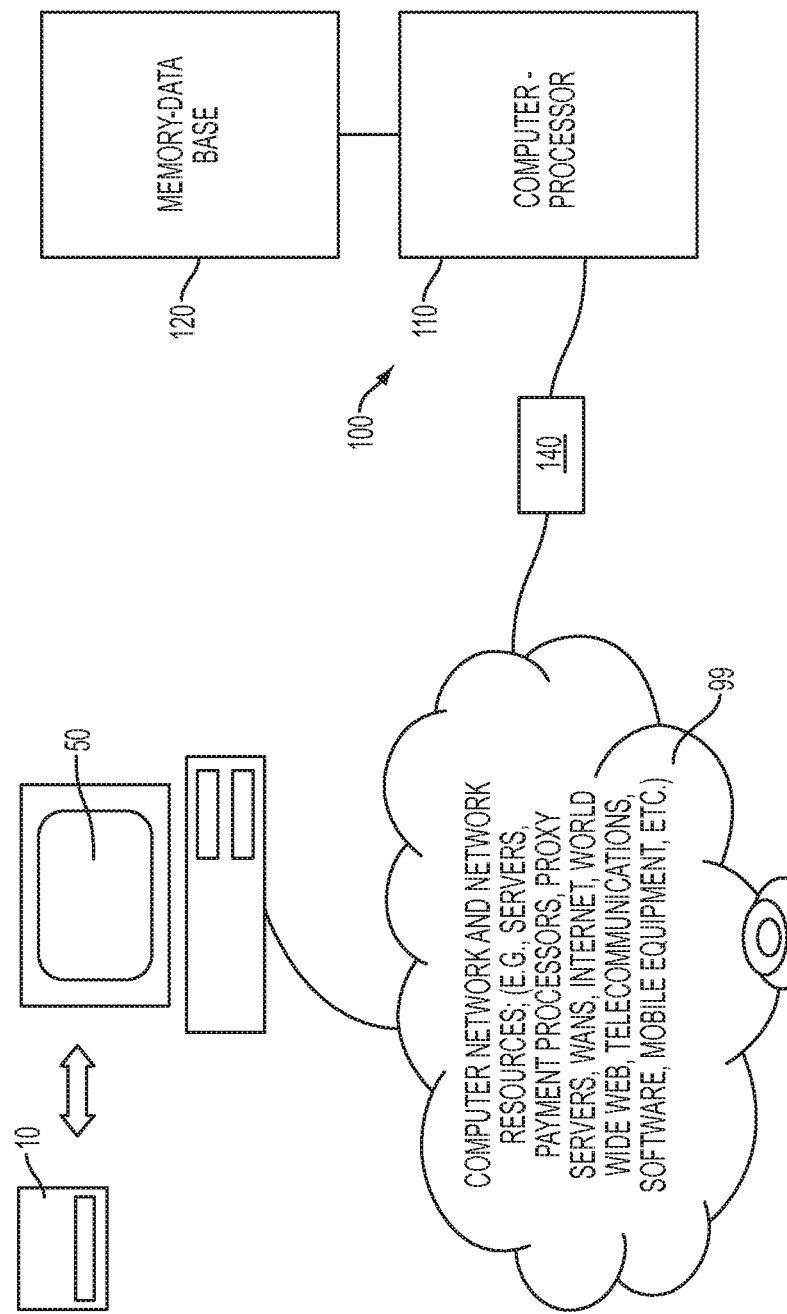
FIG. 1 is a high-level functional block diagram of a system and network for implementing financial services and products in accordance with one embodiment of the present invention.

The invention relates to a system, possibly including many different software and hardware components, that can provide a new financial product to customers. For example, in one implementation, a customer opens a card account with a card issuer and, if the customer also opens an annuity or other financial account, the customer is entitled to a rewards program on the issued card. In this example, there are no changes to the value of the financial account such as the annuity value or to the terms of the account policy such as the annuity policy. In application, the rewards are in effect moving from the annuity to the card. The rewards the customer is eligible for on the card) will be calculated as a function of the amount deposited in the annuity account. In this example, the rewards are structured to use the interchange revenues but are generally explicitly more than a share of interchange revenue (generated from credit card transactions). In this example, the rewards are a proportion of the overall long-term benefit of having an annuity or other investment product. Unlike in prior art financial products where value is measured in earnings or returns, the present invention's value is differently derived. Part of the value derives from annuity crediting, which has a character of interest income. The other part of value is derived from debit card or credit card rewards, which often have the character of merchant discounts as is the case with cash back rewards earned from the purchase of goods or services. In this manner, the financial product gives value to the customer relating to their investment by issuing rewards that are generally higher than the interchange rates.

The merchant discount can be credited to the credit card account as points that can be redeemed to reduce or eliminate the cost of a purchase, for example, airline points that can be used to obtain an airplane ticket for a reduced price, as in a conventional credit card points program. Points may also be "cashed-in" for coupons on products and services, as a check, as a deposit into an account (e.g., brokerage account), or applied to a credit card bill to reduce the amount of payment due. The credit card account record in the database may include a field for such points that can be updated as they are earned through purchases. The amount of points credited to the customer's account may be communicated to the customer. An interface may be configured by the computer system and provided to the customer to allow them to select how to redeem the points.

For example, a standalone annuity might pay a 4% annual interest rate and a standalone cash-back credit card might offer 1% cash-back. In this example, the financial product can have an annuity with a 1% interest rate and 20% cash-back (on credit card purchases worth up to, for example, 20% of the annuity's balance) on the associated card if desired. Rather than only crediting interest to the annuity, where that interest is virtually inaccessible by the policyholder until retirement and where it is subject to taxation upon withdrawal, customers can be given rewards on the associated card with a value that offsets the "reduction" to the annuity interest rate. For example, a customer is able to get rewards (e.g., monthly), well before retirement. All or most of the rewards are not added into the financial account because this would render the reward illiquid and potentially subject to taxes, as well as penalties for early withdrawal. There may be exceptions or alternative implementations that may still employ this principle. For example, rewards that are earned in the credit card could be in the form of cash that can be issued as a check to the customer and the customer would have the freedom to deposit the check in the financial account or otherwise use the cash. Another example, can be that rewards earned in the credit card account could be added to the financial account after an investment period of the financial account.

Embodiments illustratively described herein can create additional value for the customer because rewards are not taxable and because savings are gained from more efficient distribution and marketing (direct-to-consumer distribution) that are passed along to the customer as rewards. Other structural advantages can include continued loyalty as an annuity customer, demonstrated by additional deposits, renewals, and persistency, which will entitle the customer to additional rewards and penalty-free liquidity.

Annuities are one example of a financial or investment account that is particularly suited to benefit from the systems and methods illustratively described herein. Other investment products or accounts are also applicable, such as alternative insurance or investment products (e.g., life insurance, mutual fund, or brokerage account). Other examples of investment products or products can include tax-deferred accounts such as 401(k) accounts, retirement accounts, IRAs, or other such accounts. Other investment products or accounts can include bonds, mutual funds, stock investments, assets stored in anon-regulated account, or trusts.

As an option, a referral program can be incorporated into the system. The referral program can incentivize customers of the financial product to refer others to sign up for the financial vehicle. This can offer an alternative to the use of brokers or sales representatives to sell the financial product. This also reduces expenses associated with paying commissions to brokers or sales representative.

Another option that can be implemented is to include surety system, offered by a third party, surety company, that guarantees the rewards program. The surety system can reduce the customers' risk profile for the investment by having a second entity (e.g., the surety company, which is typically external and independent from the financial account provider) guarantee that the customer will receive earned rewards under the rewards program (e.g., even if the financial account provider, such as the annuity provider, cannot fulfill its related account obligation). To further clarify, in some embodiments, the provider of the financial account and the credit card account can be the same entity (e.g., one entity implements a computer system or network of computer systems in their private network that administers and maintains the financial account and a separate credit card account) and in other embodiments, these could be separate distinct entities and corresponding computer systems. The surety company and their corresponding computer system would typically be separate from the financial account provider if the reduced risk profile is sought to be implemented.

The subject technology would preferably utilize, if not be fully executed, modern computing technology. The computer technology is user-interactive and may be self-contained so that users need not leave or venture to another address within a distributed computing network to access various information. The following discussion describes the structure of such an environment, like the Internet or many common intranets, but further discussion of the methodology of one or more embodiments of the present invention is described elsewhere herein.

The computing environment includes one or more servers which communicate with a distributed computer network via communication channels, whether wired or wireless, as is well-known to those of ordinary skill in the pertinent art. The server hosts multiple Web sites and houses multiple databases necessary for the proper operation of the subject technology.

The server is any of a number of servers known to those skilled in the art that are intended to be operably connected to a network so as to operably link to a plurality of client computers via the distributed computer network. The plurality of client computers can be desktop computers, laptop computers, personal digital assistants, cellular telephones, and the like. The clients allow users to access information and run applications on the server and locally. The server and clients have displays, input devices, and output devices as would be appreciated by those of ordinary skill in the pertinent art.

An embodiment of a method of the subject technology includes:

1. A life insurance company links a debit card to a customers deferred annuity (variable or general account), immediate annuity, or life insurance policy;

2. Alternatively, a life insurance company issues its own branded credit card to deferred annuity, immediate annuity, or life insurance policyholders;

3. In either the DC or CC (debit, and credit card, respectively) embodiment, the DC or CC will provide rewards upon the purchase of goods and services. As known in the art, these rewards may be of the cash-back, miles, or reward points, variety, where miles and points can be redeemed for additional goods and services and where cash-back rewards rebate a portion of the cost of goods or services purchased with the DC or CC back to the customer's DC or CC, and, optionally to the linked annuity or other account to which the DC or CC is linked;

4. In a preferred embodiment, the crediting rate of the life company's policyholder's deferred annuity (or other product as mentioned above) is maintained well below the market rate offered by other competitors. In one embodiment, the crediting rate which is guaranteed by the company is set to the statutory minimum (currently 1% in most states for fixed rate annuities in Q1 2012, for example). For products such as indexed annuities, which offer a crediting rate which is tied to the performance of an index such as the S&P 500, the life insurance company offers its customers smaller participation rates, lower caps, smaller income rider benefits, and otherwise significantly lower guarantees than its competitors;

5. In a preferred embodiment, the total value attributed to the customer is (1) the crediting rate on the annuity and (2) the rewards related to purchases made on the DC or CC. This may entail lowering the annuity crediting rate to the lower end of those offered in the market;

6. The DC or CC rewards may also be inflation-linked, for example, and may increase annually based upon the annual increases in the Consumer Price Index—all urban consumers (CPI-U index, expected or unexpected); and 7. The reward derived from consumption-purchases made on the DC or CC which provide cash-back rewards—are inflation-linked and not taxable, whereas only the annuity crediting rate is taxable in a deferred ordinary manner. The result is an efficient after-tax, after inflation or real after-tax consumption stream provided to the policyholder as the below example demonstrates.

A high-level functional diagram for implementing features of systems or methods for providing financial services or products is provided in FIG. 1. With reference now to FIG. 1, financial transaction card 10 can be issued by a financial institution, which may also administer an associated financial product. Financial transaction card 10, also referred to as a credit card, can be a conventional credit card or debit card, which may contain information on portable non-transitory magnetic media. It should be understood that credit cards or debit cards can include instruments that do not necessarily require the possession of a physical card. For example, it should be understood that credit cards or debit cards can be inclusive of software and data on a smartphone, flashdrive, or a cloud service that is connected to a credit card or debit card account by which customers use their credit card or debit card account in making financial transactions using available financial resources on their credit or debit card account. At least one reason for this is that there may be an expected evolution in credit cards or like accounts with respect to the use or need of physical cards or physical medium. Credit cards or debit cards are also understood to include cards that include an on-board chip that is used for updating card data or account information.

For the sake of brevity, it should be understood that a reference to credit cards is also applicable to debit cards unless otherwise distinguished. Financial transaction card 10 can also be another form of portable financial account device that carries a non-transitory memory for storing financial and identification information. Financial transaction card 10 may be used by the customer to engage in transactions at a vendor's transaction site, which may be, for example, a Point-of-Sale system or a website 50; and the related transactional information is communicated from the vendor through network 99. The financial institution administering the card and/or financial account can receive the related transaction information from a payment processing service (e.g., PayPal™) that received a payment request for a transaction or can receive the related transaction information through direct (e.g., through network communications with the vendor) or indirect means (e.g., through an intermediary that first receives the information). Network 99 may be one or more interconnected computer networks and network resources, including, for example, servers, storage, applications, or other resources or communications connections. If desired, information may be communicated back to and stored on the storage carried by the credit card or a customer's equipment to update the stored information for later use or reference.

The financial institution can have computer system 100, which can comprise one or more computers, servers, laptops, tablets, smartphones, peripherals, etc. Computer system 100 receives the transaction information through network 99 at its communication hardware 140. Communication hardware 140 may be internal components of a computer or separate distributed hardware that connects the computer system to a network. Communication hardware 140 receives the transaction information, which may include the transaction amount, identification information to associate the transaction with the customer, and an associated financial product. Other information can also be received, such as information relating to the duration the customer has owned financial transaction card 10 and the associated financial product and related date information for determining an accounting period in which the transaction took place. Communication hardware 140 is configured to transmit financial account and credit card account information to the customer for display or storage.

FIG. 1 further illustrates computer system 100, which may comprise computer 110 having one or more central processing units, and non-transient memory 120 for storing data and software. Computer system 100 is configured to carry out the steps encoded in software instructions for manipulating the data received over the lines of communication and storing data (e.g., modified data) in memory 120. The computer system may further comprise transient memory, for example, RAM, for processing the data and instructions, and peripherals such as displays, printers, keyboards, mice, and interface devices known to those in the computer arts. Memory 120 can be an internal or external database. If desired, one or more computers and storage systems can be used to implement computer system 100.

Figure 2:
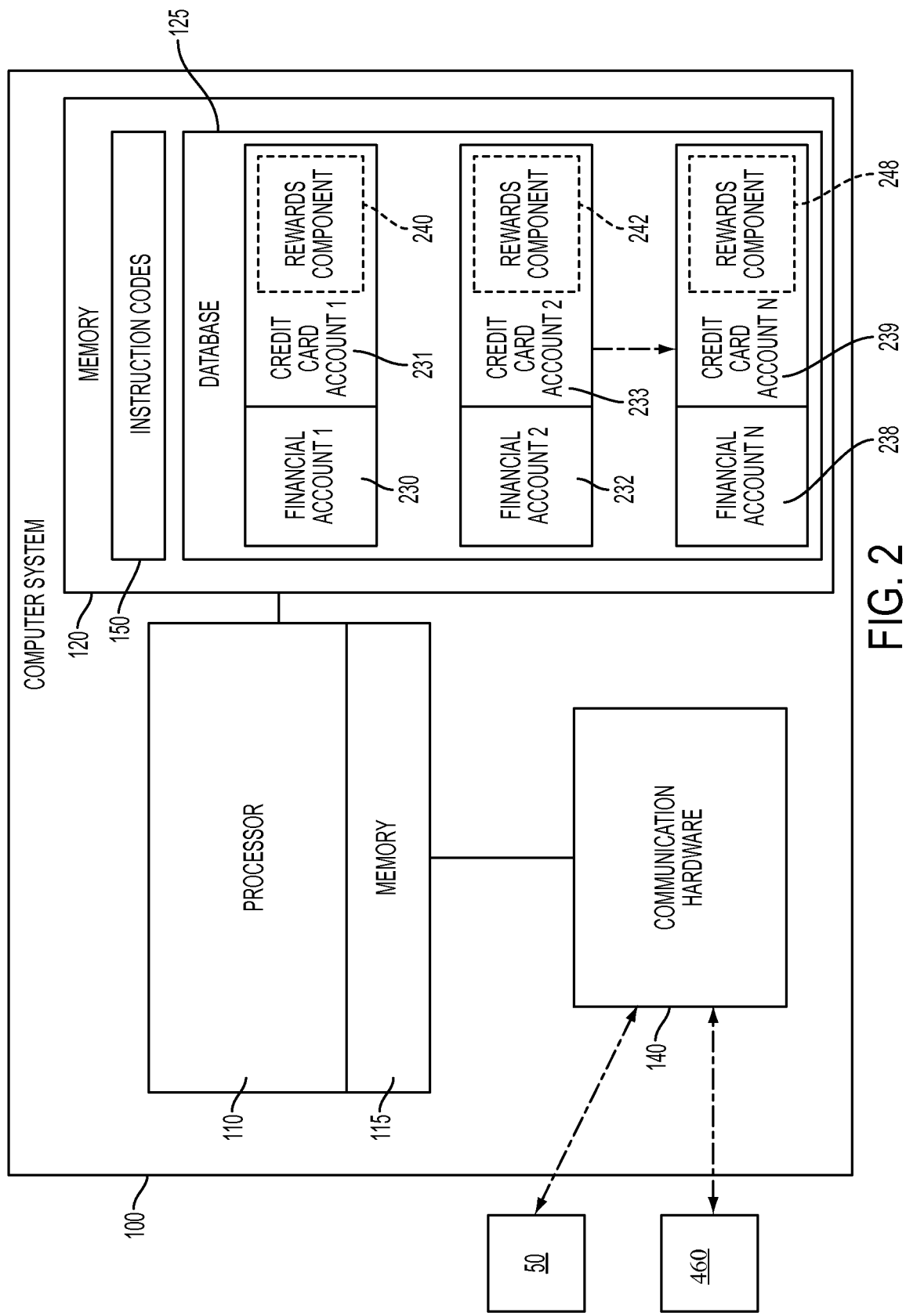
FIG. 2 is a functional block diagram illustrating a computer system configured to be in communication with other remote systems in accordance with one embodiment of the present invention.

An embodiment of computer system 100 is illustrated in FIG. 2. With reference now to FIG. 2, computer system 100 can include processor 110 associated with memory 115, and memory 120. Memory 120 can be configured to include software comprising instruction code 150 (e.g., a resident executable software application), and a structured database 125 for storing data in records. In implementation, memory 120 may be implemented using multiple computers containing structured databases in order to provide sufficient database resources to the system. Memory 115 would typically be RAM or other form of cached resources that can hold executable code and related data in computer operation. Memory 120 will typically be structured to contain non-transient computer readable medium for use in operation of the system. Database 125 can include accounts information and contain a database that stores pertinent data and data structures. For example, as shown, data fields 230-239, 240, 242, 248 are included in database 125. The values in the data fields can be interrelated to achieve desired rates of return.

FIG. 2 depicts the electronic relationship between the data related to financial account 1 230, credit card account 1 231, and reward component 240. If desired, the reward component or amount may be a separate account associated with the credit card account. The values stored in memory 120 for reward component 240 can be calculated from values stored in its associated financial account 230, and from transaction data obtained from the use of the credit card assigned to credit card account 231. Processing by the computer system is performed to calculate an amount of reward benefits to credit to the customer. The amount of reward benefits is, for example, determined to be an eligible percentage of the credit card transaction activity generated by the card owner. If desired, the total amount of rewards generated within a particular time period can be limited to a percentage of the amount in the financial account. The reward component values stored in memory 120 may optionally be communicated to an outside surety company to obtain guarantees on at least part of the reward benefits credited to the customer.

In one embodiment, a financial account is opened and a principal amount is deposited in the financial account by a customer, and in addition, a financial transaction card is issued to the customer as part of opening the account. In some embodiments, the computer system will verify that the principal and account have been created or exist in the computer system as a requirement for receiving rewards in the credit card account based on credit card activity. Financial account 230 can, for example, be an annuity or a brokerage account, which can comprise data values identifying the deposited principal, interest rates, accrued interest, inception date, termination date, payout rates, age of the customer, names of beneficiaries, etc. The financial transaction card generates rewards, which can be in the form of a cash flow directly back to the customer or if desired, a deposit into a separate rewards account associated with the card.

The financial account, which is combined with the spending resources of a credit card reward program, is preferably a structured saving vehicle that requires a monetary deposit by the customer and is structured to earn value over time in the account for the customer based on an offered interest rate, or other metric. It is generally not inclusive of accounts such as everyday transaction accounts; such as checking accounts that are structured for the customer's everyday use.

In another embodiment, a financial transaction card is initially opened by a customer and at a later time, the customer opens a financial account and deposits a principal amount therein. When the financial account is opened, a reward account or component is also created and both may be associated with the previously opened transaction card. This allows the customer to begin earning transaction card benefits. Other variations in the sequence or timing are contemplated to the extent that they do not vary from the principles of the present invention.

The information relating to the account and the card can be entered into computer system 100 through an interface and stored in database 125. Database 125 may be, for example, a relational, hierarchical, object-oriented, network, or correlation database. Transaction card 10, reward component 240, and financial account 230 may be related to each other using customer and/or financial information, where the information may be stored in records. The database may be localized on a single machine or distributed over multiple machines at the same or different locations.

Information related to the financial product accounts may include, for example, the principal deposited into the account at inception, identification information associating a financial product account to a specific customer, identification information associating the financial product account to a specific financial transaction card 10 (e.g., the financial transaction card issued to the customer upon opening the financial product account), the period of time that the account is intended to stay open, and the period of time in which financial calculations and accruals are conducted.

Communication hardware 140 allows the computer system 100 to transmit and receive data over communication lines connected to one or more networks, which may be for example, the Internet, LAN, WAN, and MAN networks, telecommunication networks, satellite networks, and/or wireless networks. Communication hardware 140 may handle the packetizing or depacketizing of data and handle protocol requirement necessary for transmitting and receiving packets. Communication hardware 140 can transmit or receive data or information to or from computer system 100, which it is serving.

Financial accounts 230, 232, and 238 can be individual annuity accounts that are stored in memory 120 and associated with corresponding credit card accounts 231, 233, and 239, and their reward components 240, 242, and 248, which can be stored in a physically or logically separate memory. Computer system 100 will be configured to maintain accumulation values for available rewards benefits that records the running total of the rewards granted or available to a policyholder of the associated annuity account.

Figure 3:
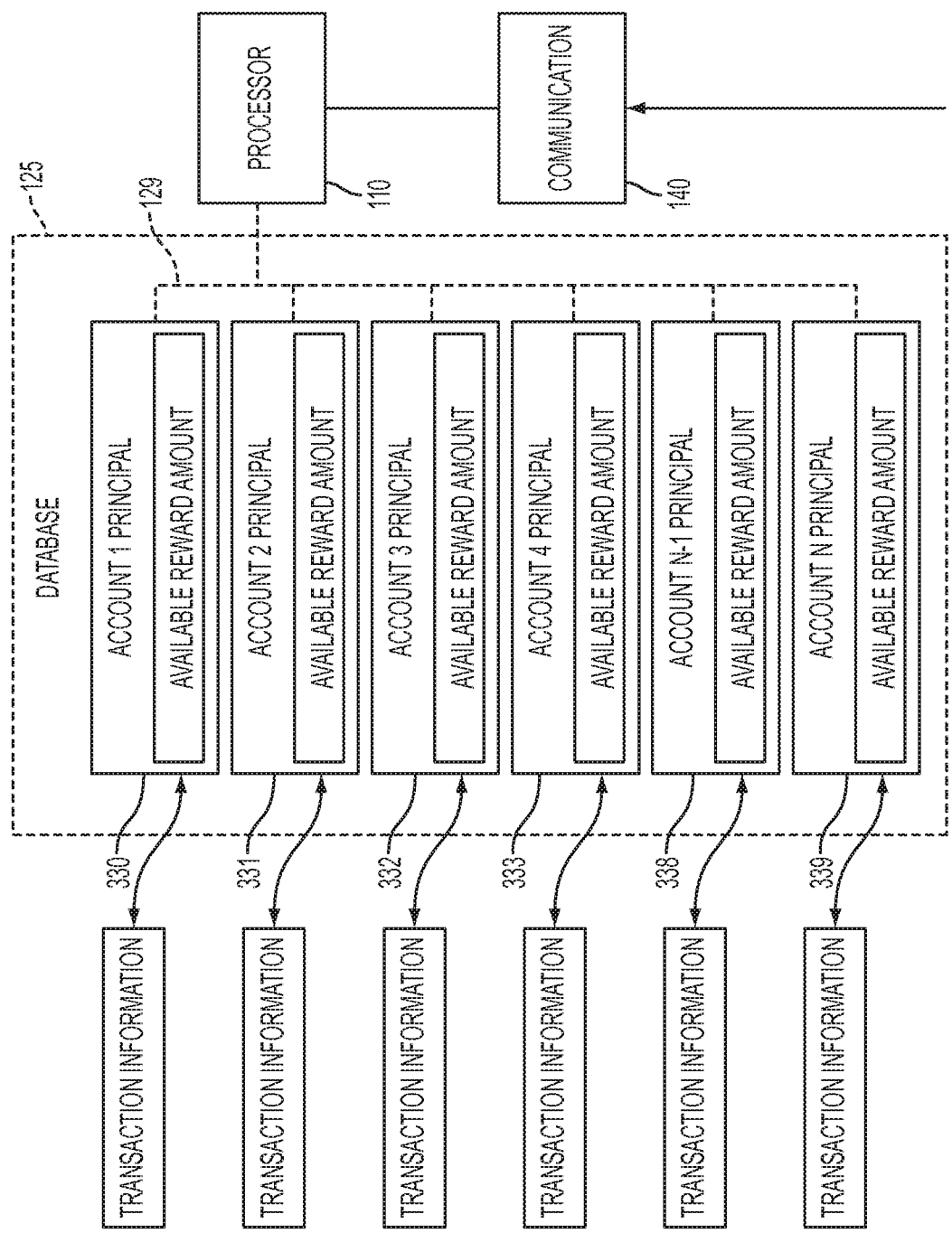
FIG. 3 is a diagram of a functional block diagram illustrating an operational relationship between rewards and account value in accordance with one embodiment of the present invention.

One aspect of the financial product is that the amount and calculation of reward benefits in the credit card account is determined by the amount of deposit that the customer has made into the financial or investment account. FIG. 3 illustrates an example of these electronic relationships. More specifically, FIG. 3 illustrates an example of an arrangement of a plurality of financial accounts 129 in database 125. The amount of rewards, which may be subject to a specified maximum, available to a customer for a predetermined financial period is calculated by the computer system utilizing processor 110, and stored in part of the record associated with each of the accounts 330-339. For example, the system can be configured to be able to provide a maximum amount of reward benefits over a time period. The maximum can be based on the current account value of the financial account and a predetermined value attribution rate that is paid in cash-back or other rewards in the credit card account. The available reward amount can, for example, correlate to the customer being eligible to receive X percentage of total credit card transactions up to a maximum total Y amount of transactions as cash-back or redeemable points to the customer during a particular financial period.

In the event of a withdrawal of funds from the underlying financial account, different approaches can be applied to determine and calculate reward eligibility. The customer may be allowed to accrue the full year's reward amount of merchant discounts at the start of a new year (i.e., assuming the customer will maintain the investment of financial account without withdrawals for a specified period such as a year). Alternatively, the maximum eligible reward amount can be set at the end of an investment period. In another example, the eligibility for rewards can be adjusted to correspond to the amount of time the funds remained invested. In typical embodiments, withdrawal or surrender of invested funds from the financial account will presently or later reduce the amount of eligible awards (as compared to the amount prior to the withdrawal. If desired, unredeemed points could be forfeited if the customer makes a partial withdrawal or surrenders the financial account (e.g., terminates the investment portion before its agreed or expected structural maturity).

The maximum amount of rewards for which a customer is eligible can be determined from the financial account value of the preceding year, such that the reward program is backwards-looking and the rewards are earned by maintaining a value in the account for a past period. In this example, the customer would have no restriction on the amount of rewards they could earn in a given time. This arrangement rewards the customer for their loyalty by issuing the rewards to a customer that has remained invested in the product in a later period.

In operation, after each purchase using one of the issued credit cards, database 125 is updated to reflect the amount of eligible reward benefits that are now currently available as a cash-back or reward benefit to the customer. The computer system can administer the eligible and available reward benefits to be in compliance with the specified attribution rate on the investment in the financial account over a period of time. Additional rewards greater than the available reward amount may be provided to achieve a specified attribution rate. The data such as eligible and available rewards may be transmitted to the customer of the associated account so it can be displayed on the customer's computer or mobile device, and may also be transmitted to a surety company computer system for processing. The amount of rewards currently available, used and/or remaining (e.g., at the end of a particular reporting or financial period) may also be viewed by logging into a website of the financial institution providing the annuity account and/or credit card. The calculations can be done by the processors in data communication with the database.

The computer system can implement a rollover feature. The computer system can track the amount of eligible rewards benefit that was consumed by a customer and whether it has a reached a maximum available eligible amount. In some embodiments, if less than the maximum eligible award is consumed by the customer, the computer system can be configured to roll over all or some of the remaining amount of eligible awards to the following year. For example, if a customer has a $100,000 annuity, he may be eligible for cash back rewards of 15% on the first $20,000 of annual spend on his associated credit card. If he only spends $15,000 in a given year, then in the following year (assuming no annuity withdrawals) he will be eligible for cash back of 15% on $25,000 of credit card spend ($20,000 annual maximum plus $5,000 of rollover). A referral feature can also be implemented that logically links activity from accounts referred to the financial institution to a referring customer's account. Each of the account records 330-339 can also be logically associated with one or more of the other stored annul accounts 330-339, so that accounts opened upon referral by a prior account customer can be identified to determine additional account values to be used for calculating the maximum reward amount available.

Figure 4:
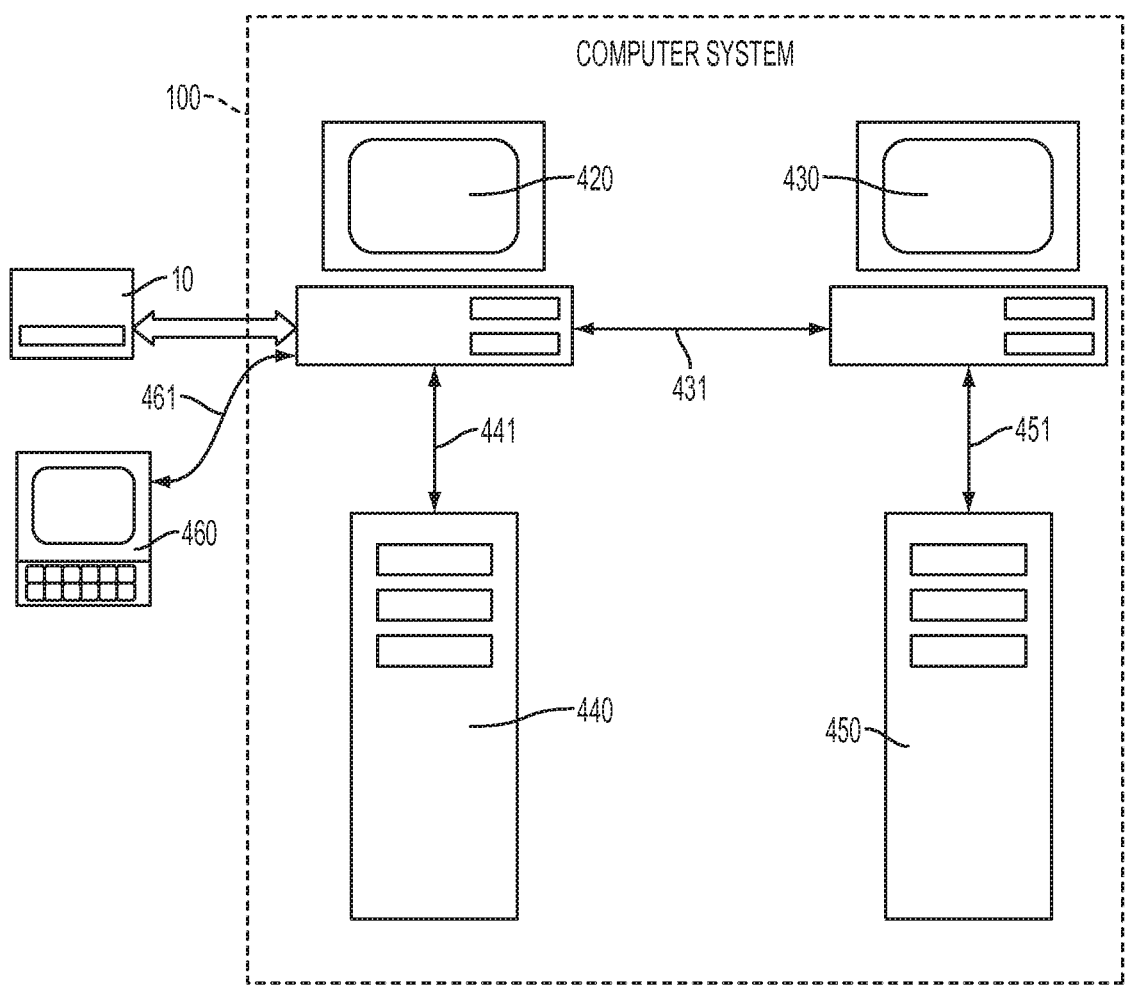
FIG. 4 is a diagram of a functional block diagram illustrating an embodiment in which administration of the financial account and credit card can be operated on different computer systems in accordance with one embodiment of the present invention.

In some embodiments, a system and method can be implemented that divide the storage and administration of account information between two entities or systems. For example, a first entity can be responsible for offering, creating, and administering the financial account and the terms of the rewards to be received based on the financial account from credit card usage and another entity can be responsible for storing and administering the credit card account and issuing the reward benefits on the card. An illustrative embodiment of this arrangement is shown in FIG. 4. With reference now to FIG. 4, computer system 100 can include multiple computer systems 420, 430, 440, that communicate with each other and with one or more other devices 450 that are remote from the computer system 100 over data communications lines. The data communications can be used for sending and receiving data related to opening accounts and data for administering the credit card accounts and financial accounts.

Computer system 100 may comprise separate computer(s) 420 for opening and administering the credit card accounts, and separate computer(s) 430 for opening and administering the financial product accounts. Computer(s) 420 and computer(s) 430 can communicate over a data line 431 (e.g., wired, wireless, WAN, LAN, Internet, etc.). These computers may also be in communication with one or more database servers 440, 450 over data communication lines 441, 451 for storage and retrieval of data related to the financial transaction cards 10 and financial product accounts.

Computer system 100 may further comprise communication hardware 140 that could be integral with one of the computers 420, 430, or hardware separate from any particular computer, that connects computer system 100 over one or more communication line(s) 461 to remote devices 460. Remote devices 460 can include a user interface for customers. Computer system 100 is configured to send information to the remote device 460 to display financial information to a customer and receive information regarding a card or financial product from the customer.

Computer system 100 is also configured to transmit information to customers, so that they can view information, including their current cash-back amount, potential cash-back left to receive if they continue to use their card, and/or the current value of their financial product account.

In one embodiment, the credit card can be issued or administered by a different institution than the institution that opens and administers the financial account. In such an embodiment data necessary to implement and cooperatively administer the financial account, financial transaction card, and rewards benefits is communicated using transmissions between each provider's computer system. For example, the computer systems of the entity that offered the financial product with a specified rate of return from the credit card component, where rate of return is being used generically to include non taxable cash flows, can transmit the rate of return, the percentage to be used for identifying the amount of cash-back, the maximum eligible cash-back amount, and/or other related data to the computer system of the credit card provider in order to authorize and configure the credit card for that customer to issue rewards in accordance with the specified attribution rate for the financial product. Information about current status, usage, account value, or other information can also be communicated between the two systems.

Figure 5:
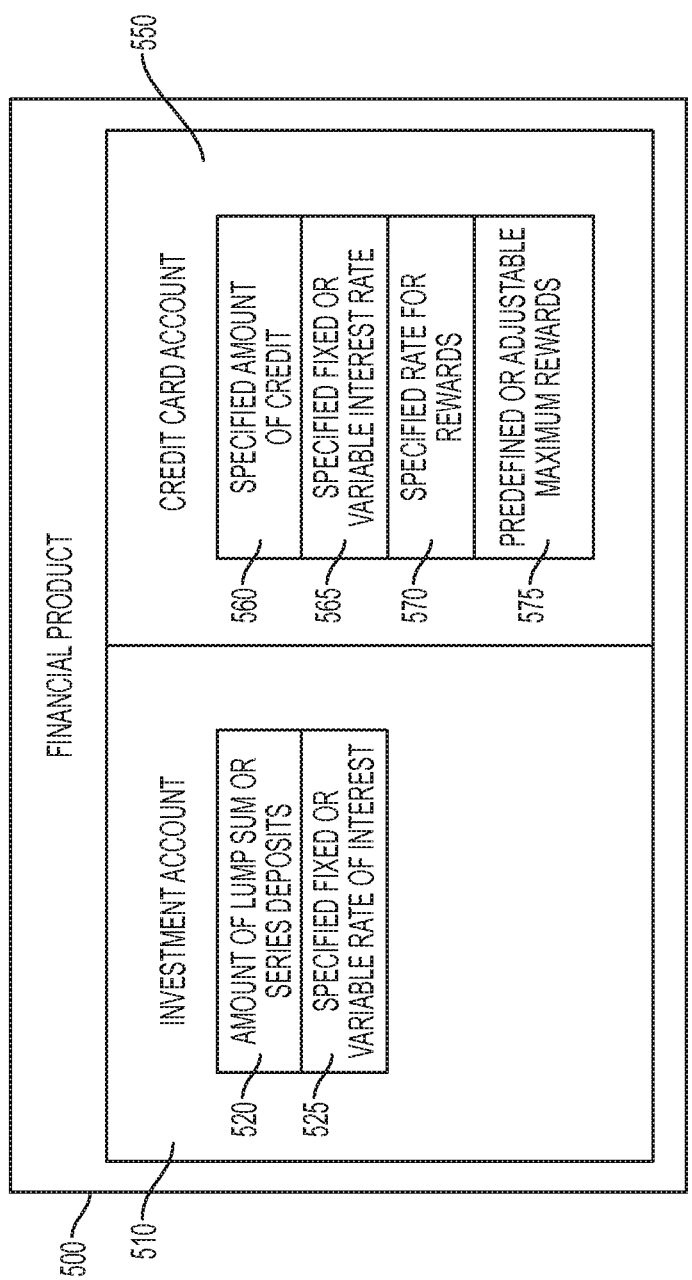
FIG. 5 is a diagram of an exemplary structure of a financial product in accordance with one embodiment of the present invention.

An illustrative arrangement of a financial product is shown in FIG. 5. FIG. 5 can also reflect an electronic structure and relationship of the components of the product as implemented on computer systems and databases. For example, in operation, the computer systems use the structure and relationship to service the financial product. As shown in FIG. 5, financial product 500 includes two components. A first component may be an investment account 510, which is also referred to as a financial account, having a plurality of structural characteristics, which define the account. The account can include investment amount 520, which may be a lump sum deposit or a series of deposits made incrementally over a defined period of time. Investment account 510 can have an accumulation period in which it can have an interest rate 525 that is fixed or variable depending upon the type of investment selected by a customer. If desired, investment account 510 may also have a defined accumulation phase, such as for an annuity account during which a series of deposits are made into the account incrementally over a set period of time. Investment account 510 may also have a defined annuitization phase (if the account is an annuity account) during which the account pays disbursements to the customer incrementally over a set period of time. In such embodiments, investment account 510 may also have a specific age at which time the accumulation phase ends and the annuitization phase begins. Investment account 520 is preferably an illiquid investment such as an insurance policy, retirement account, or other long term (e.g., single year, multi-year) investment structure that is designed to dissuade customers from redeeming the investment early. For example, the financial account will be structured to deduct all or a substantial portion of accumulation earning in the financial account or deduct a portion of the principal when a withdrawal is made before the investment has matured. In such a structure, an early withdrawal before the long term investment (e.g., multi-year investment) has matured will deduct withdrawal charges equaling a significant portion of earning in the financial account and/or could deduct a portion of the principal as part of the withdrawal charge. Total surrender and withdrawal charges on annuities typically range from zero to 15%, or more, of any amounts withdrawn early. Optionally, and as known in the art, an annuity may provide for a percentage of the balance that can be withdrawn annually without penalty (e.g., 10-20%). If desired, a surrender charge schedule can be implemented for the annuity or financial account (e.g., 5% in the first year, 4% in the second year, etc.). The computer system can be configured to apply these restrictions. In contrast, conventional checking accounts do not restrict the use of funds that are available on account. The second component may be credit card account 550 that provides value to the holder of the financial product as cash-back or other forms of rewards. The credit card account can be characterized by a specific amount of credit 560 provided to the customer. Credit card account 550 may have a specific interest rate charge 565 that is applied to outstanding balances on the credit card. In the case of debit cards, available credit can be the amount of money in the customer's corresponding checking account and/or any available credit in addition to the amount on deposit in the checking account. Credit card account 550 may also provide the customer a specified rate of rewards 570, which is calculated as a specific percentage of purchases made with the card, and may be limited to a predefined maximum amount for a specific period. If less than the maximum amount of rewards is used in a given period, the remaining amount may be rolled over into the next period.

Predefined maximum amount of reward 575 could be calculated from investment amount 520 of investment account 510 and specified rate of rewards 570 of the credit card account 550, to achieve an intended accumulation rate on the financial product 500.

The customer could receive the cash-back reward as a credit on the credit card account, or as a gift card issued by the financial institution administering the financial product. If desired, the entire value can be applied to the card. Other forms of rewards are also contemplated.

In addition, embodiments of the invention may optionally include a secured credit card account that is secured by the financial account. The computer system may link investment account 510 to the credit card account 550 as a security for outstanding balances on the card. If desired, a default on payment of accumulated credit card debt may result in the computer system using funds in the financial account to pay for the outstanding charges. The computer system can deduct a sufficient amount of principal from the financial account and the information may be updated in the database. In some embodiments, the computer system may communicate the deducted amount to the institution administering the credit card account. In this manner, the credit card account provides rewards related to the investment account, and the investment account secures the credit card.

FIG. 5 also highlights the logical connection of the data that implements the financial product using the investment account and credit card account. FIG. 5 is also helpful to explain that the company offering the product implements a two-sided structural relationship in a computer system in order to publicly offer and implement a specified financial performance for the product. One aspect of this structure is that the offering company specifies and publishes a total attribution rate for the financial product and in turn, also specifies and publishes the value attribution rate for the rewards component and the value attribution rate for the earnings in the investment account. It should also be understood that other ways of specifying the value attribution rate such as one that is variable or index can also be implemented if desired. This structure provides two value streams; one deferred value stream from the investment account and one current value stream from the credit card rewards.

Figure 6:
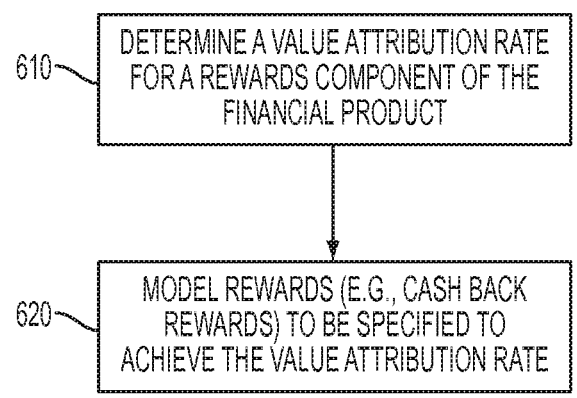
FIG. 6 is a flow chart illustrating a process for issuing rewards benefits based on an attribution rate in accordance with one embodiment of the present invention.

The value attribution rate for the second component, the credit card reward component, is based on issuing reward benefits in response to credit card transactions. The rewards are received in response to spending as a form of cash-back or points-based merchant discount that enhances the customer's current spending capability. The attribution rate has to be processed and converted into a form that identifies cash-back or other reward benefits that are currently issued to the customer in order to achieve the specified attribution rate. FIG. 6 is an illustrative diagram illustrating a method for processing credit card accounts to issue sufficient "earnings" by way of rewards to achieve the specified value attribution rate.

In step 610, the offering financial company determines a value attribution rate for a rewards component of the financial product and stores that information on a computer system. The rate will, for example, be specified in product literature and information to identify for customers and potential customers the expected financial performance of the financial product. For example, the attribution rate for the rewards component can be equated to an IRR of 4% and the rate for the investment component can be 1%. This investment component could be a minimum allowed by regulatory agencies, or it could be greater than the minimum allowed rate but less than a normal market average or a competitor's rate. In step 620, a financial model is implemented in the computer system that models rewards (e.g., cash-back rewards) to be specified to achieve the value attribution rate identified for the reward component. The financial model and supporting calculations will be configured to generate output that achieves the attribution rate in response to credit card transactions. In one implementation, when the financial product is instantiated in a computer system, the model or procedures implemented on the computer system can use the investment information from a financial product and the value attribution rate for the rewards components to generate rewards that achieve attribution rate using cash-back or benefit rewards payments.

Figure 7:
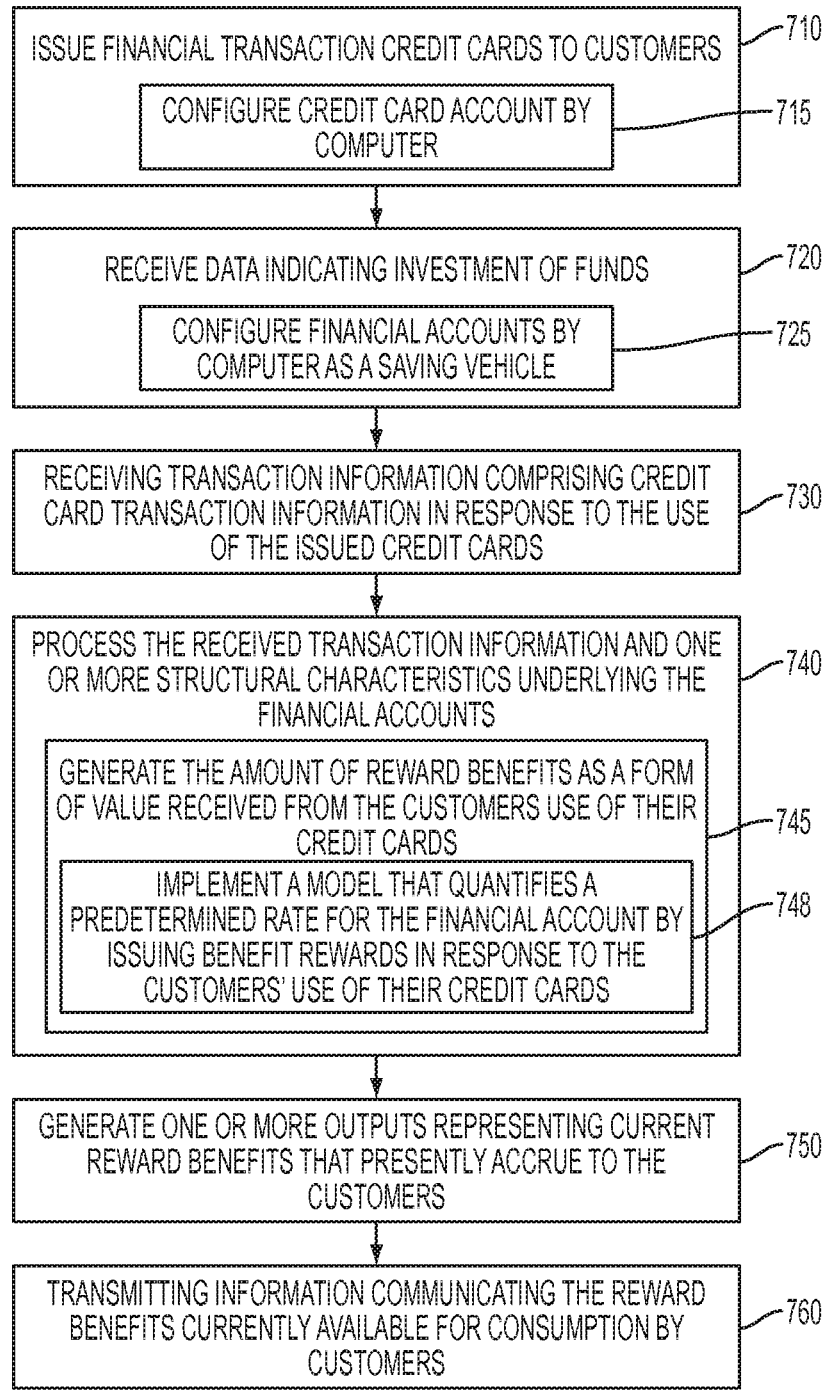
FIG. 7 is a flow chart illustrating a method for providing investment products having associated credit cards for receiving an attribution rate on the investment amount in corresponding credit card accounts in accordance with one embodiment of the invention.

FIG. 7 shows a flow chart illustrating a computer-implemented method for providing investment products having associated credit cards for receiving an attribution rate on the investment amount in corresponding credit card accounts. At step 710, a financial institution issues a financial transaction credit card to customers. Issuing a financial transaction credit card can be in response to a credit card application submitted by a customer. Issuing a financial transaction credit card can also be the generation of a credit card or similar transaction instrument that is electronically connected to a financial transaction credit card account, information carried by the credit card and account records can be connected by way of identifiers such as a card number or personal customer information. Issuing the card may also include mailing the card with necessary encoded information to the customer, or physically handing the customer a card at a broker or agent's location. In the event, the credit card type instrument can be transmitted electronically; a message is electronically generated for transmitting the instrument to the customer. Step 710 can include step 715. As already mentioned, at step 715, individual credit card accounts are configured in the computer system to be connected to the cards so as to enable computer-implemented administration of the card and the related usage of the credit cards.

At step 720, configuring the account can comprise receiving data indicating investment of funds by customer(s) into corresponding financial account(s) for each customer, where the accounts may have one or more structural characteristics. If desired, a user interface may be configured to facilitate entry of the data into a computer system. The structural characteristics can be, for example, interest rates paid on money in the account and specific returns on investment specified for the account. Step 720 may include step 725, which is related to the implementation of the financial account. At step 725, the specific financial accounts, which are investments directed to providing a savings vehicle to customers, are configured by computer for the benefit of customers.

In operation, the process steps and substeps can be in a different order. For example, the financial account can be first configured and followed by implementing the credit card account and related rewards component.

At step 730, transaction information is received from one or more remote computer systems comprising credit card transaction information that is received in response to the use of the issued credit cards by customers when the customers spend credit available on their corresponding cards. At step 740, the computer system processes the received transaction information and one or more of the structural characteristics underlying the financial accounts to calculate current reward benefits that would presently accrue to the customers. The structural characteristic can be a value attribution rate, current account value of the financial account, a cash-back percentage, a referral percentage, a maximum eligibility for rewards, or other data from the financial account that is used in calculating the appropriate amount of rewards to be issued to individual customers. At step 745, the computer system, through the processing, generates the amount of reward benefits as a form of value received upon spending by customers from the customers' use of their credit cards. At step 748, the processing implements a model that quantifies a predetermined value attribution rate specified for the financial account by issuing benefit rewards for the customer's consumption in response to the customers' use of their credit cards. The predetermined value attribution rate can be an characteristic of the account, which can be composed of at least two components that include an untaxed reward benefits rate for the credit card and a taxed interest rate for the funds deposited in the financial account.

At step 750, the computer system generates one or more outputs representing the current reward benefits in response to reception of transaction information. The generated output(s) representing current reward benefits are implemented to provide additional spending resources that have accrued to the customers. The outputs may be communicated to the customer providing at least the amount of the calculated reward benefits, but may also include additional outputs representing the remaining amount of benefits for which the customer is eligible.

At step 760, the computer system transmits the information communicating the reward benefits currently available for consumption by customers, where the information can be transmitted, for example, by communication hardware of the computer system over lines of communication.

Figure 8:
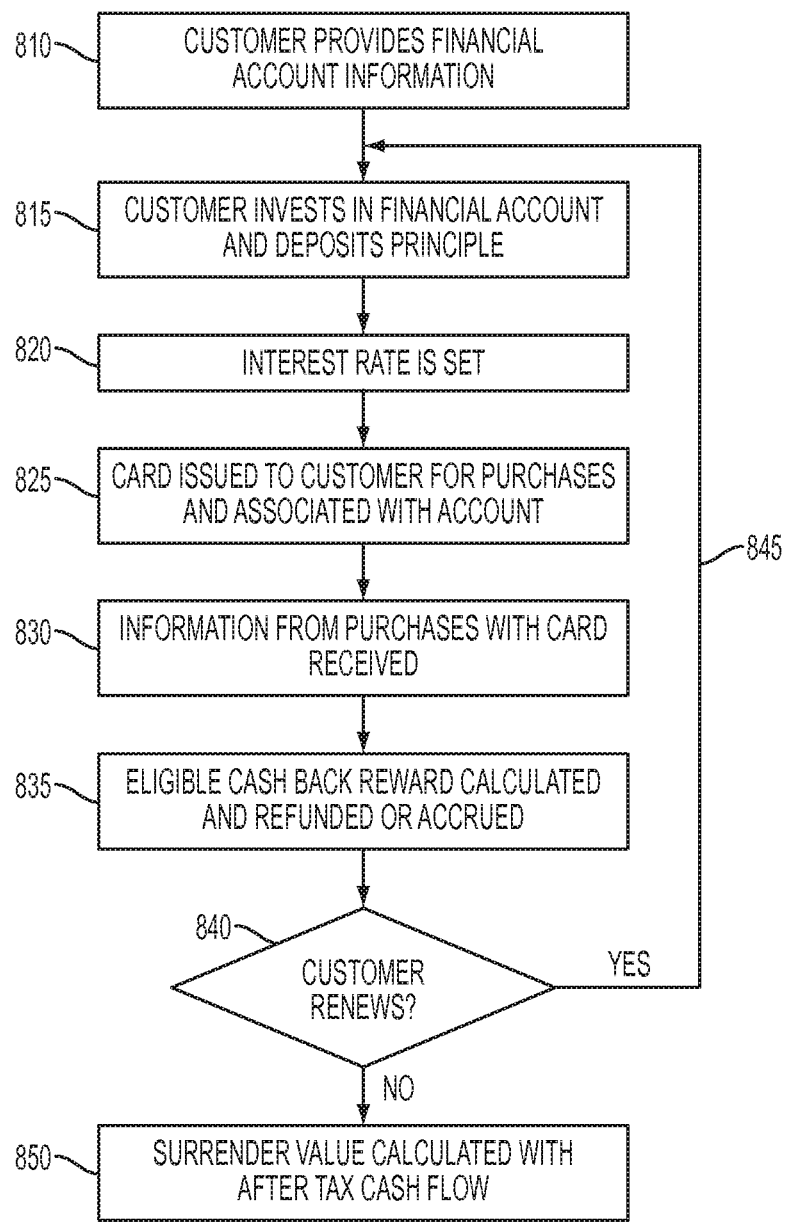
FIG. 8 is a flow chart that illustrates an example of the steps for carrying out one embodiment related to renewals in accordance with the present invention.

A flow chart in FIG. 8 illustrates the exemplary steps of another computer-implemented of an embodiment of the present invention for providing a financial product.

At step 810, the financial institution receives personal and financial information from the customer or an intermediary for the customer. The financial institution's computer system receives the customer's personal and financial information over lines of communication which may have been transmitted over one or more networks to the financial institution. The information may be segregated and stored in one or more record(s) in one or more databases for later retrieval and/or updating.

At step 815, a computer system receives and records a deposit of a principal amount provided by the customer into a financial account (e.g., a new investment product) and makes the customer eligible to receive an interest rate credited to the account, as well as reward benefits. The amount is recorded in a database associated with the computer system.

At step 820, the interest rate for the account may be set if the type of account selected by the customer is an interest-bearing account, for example, an annuity, and stored in the database record of the account. In some implementation, the interest rate for the account may be limited to the minimum rate allowed under state or other applicable law, for example, 1% for a fixed-rate annuity in most states. The interest rate may be established for the lifetime of the account, or it may vary over the life of the account based on other factors, for example, the amount of time the account has been held by the customer, changes in a prime rate, and changes in a consumer price index. If the interest rate varies, a specific formula used to determine the rate at a particular time may be established and stored in the database record of the account.

At step 825, a financial transaction card, such as a credit or debit card, may be issued to the customer. The card can be associated with the financial account and be eligible for earning rewards from its use in making purchases of goods and services, as well as potentially other financial transactions. The amount of reward benefits provided to the customer may, for example, be limited by the computer system to a maximum value correlated with the amount initially invested in the financial account or an amount currently in the account.

If the structure specifies a maximum amount of rewards (e.g., as a way to control costs), the proportion of the financial account amount used to determine the maximum reward benefit available may increase with time to compensate the customer for the amount of time the financial institution administers the account, or for changes in the Consumer Price Index.

At step 830, when a customer makes a purchase or engages in a financial transaction using the card, the financial transaction information is transmitted to the financial institution computer system administering the financial account or credit card account, and received by the communication hardware of the computer system over communication lines. The information may be processed by the computer system and stored in memory associated with the account and credit card. The financial transaction information may include, for example, the amount of the transaction, the date and time of the transaction, the account number, the customer name or other identification, and/or the vendor's information. The financial institution may receive and store one or more of the pieces of information in a database.

At step 835, the amount of the transaction resulting from use of the card and received by the financial institution may be used to calculate the amount of a rebate to be refunded to the customer as a cash-back reward, or credited to a reward account that stores the accumulating amount of rewards. At step 840, the financial institution determines whether the duration of the account has expired, and if it has, sends a communication to the customer requesting him to decide whether he wishes to renew the financial account, or terminate it and receive the amount accumulated in the deferred reward account.

At step 845, if the customer decides to renew the account, the total amount in the financial account, including the principal and any accrued interest, may be rolled over into a new account with a new lifetime and interest rate. At this time, the deferred reward account may be closed and the total accumulated rewards provided to the customer as a lump sum. At step 850, if the customer does not renew the financial account, the total value of the financial account may be calculated and a check can be prepared and sent to him for the principal and interest. A check can also be sent for a total amount that has accrued in the deferred reward account. The financial account, card account, and reward account records in the database may then be closed out and/or archived as necessary.

Figure 9:
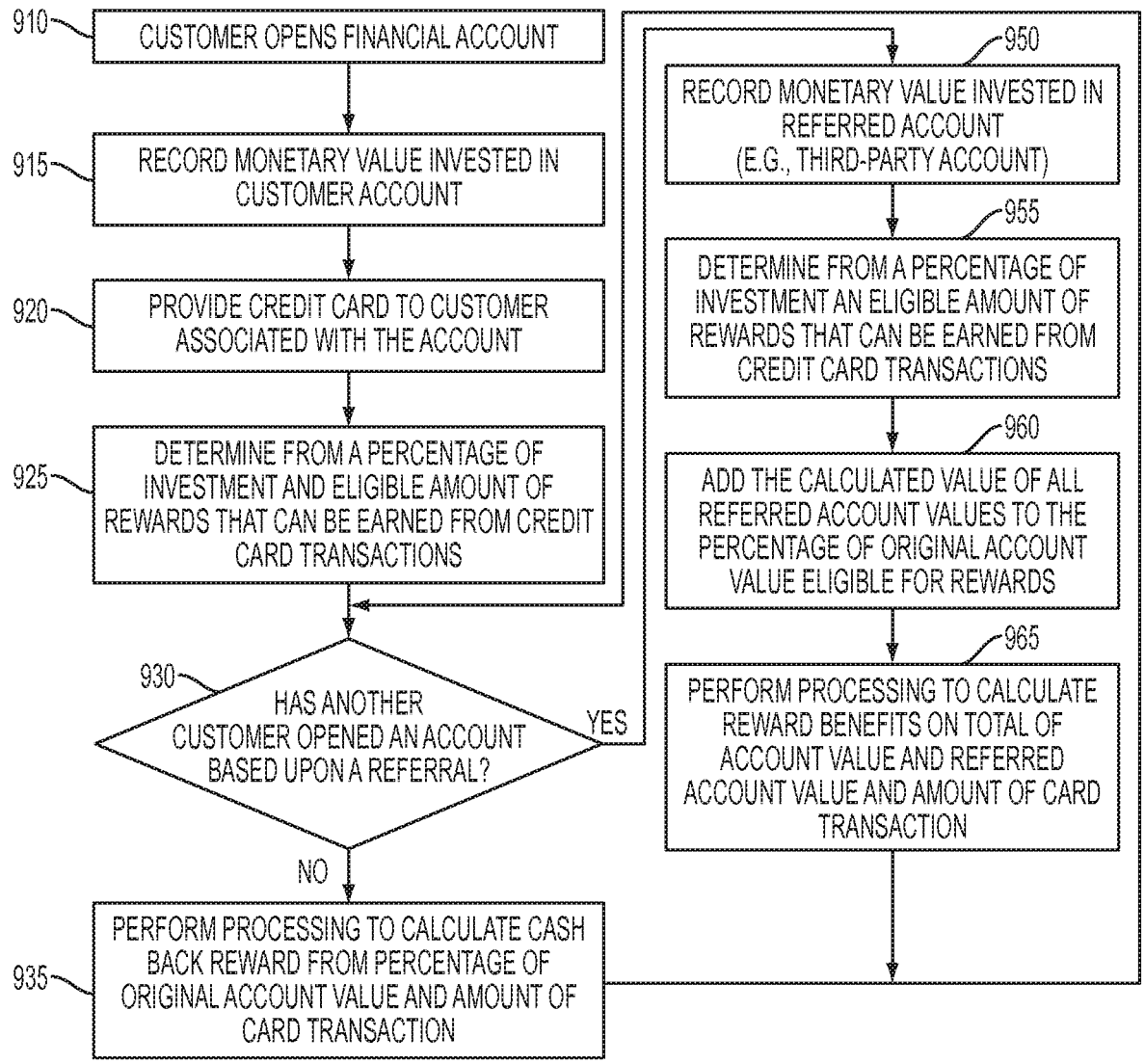
FIG. 9 is a flow chart that illustrates another example of implementing a referral program as part of the financial system in accordance with one embodiment of the present invention.

FIG. 9 illustrates another embodiment that tracks additional financial accounts opened by third-parties because of a referral by the customer of the original financial account, and includes a portion of the amount deposited in each of the one or more additional accounts in the calculation of the maximum amount of reward benefits available to the customer. Each retelling customer assists with marketing the financial product to third-parties that may then subsequently open their own financial account based upon the referral. The referring customer obtains additional value from such referral through an increase in eligible reward amounts, which may be proportional to the invested amount(s) of the third party(ies). The increase in eligible rewards can affect the total attribution rate of the financial product by increasing the value attribution rate realized on the credit card account.

At step 910, a customer opens a financial account with the financial institution which may comprise investing a principal amount in a financial product offered by the financial institution. Opening of the financial account by the financial institution may comprise the computer-implemented steps of allocating memory space in the computer, and configuring a user interface for entering the customer's personal information and financial data into the computer system. At step 915, the monetary amount invested in the financial product is recorded in a computer system.

The computer system may store the personal information and financial data, which may include the principal paid into the account into the non-transient computer memory. At step 920, a credit card is issued to the customer for investing in the financial product, which has financial terms that provide for a benefit to the customer in the form of a cash-back reward or other rewards for using the credit card. At step 925, a computer system performs processing to calculate a maximum amount of reward benefits for which the customer is eligible, as a percentage of the initial amount invested in the financial product.

At step 930, the financial institution determines if other financial products have been opened due to a referral provided by the first customer. The determination can, for example, be accomplished by checking a field in the database for the referring customer and/or the referred customer. If the financial institution determines that other customers have opened accounts and invested in the financial products that the financial institution offers, it identifies the amounts invested in these referral account(s) and configures the database to identify these relationships between the customers and accounts. The referred accounts that are opened because of a referral by a first customer are sometimes referred to as third-party financial accounts. At step 935, if the result of step 930 was "no," the cash-back reward is calculated from a percentage of the first account value and a percentage of the amount of any card transaction(s) for that customer. At step 950, if the result of step 930 was "yes," the value of the amount invested in the referred account is recorded, and is associated with the original account (the account of the customer that made the referrals) in the database for later use in calculations by the computer system in determining a merchant discount or other reward. The association between each customer and the additional third-party accounts that are opened based upon a referral, may be stored in a field in the computer system database.

The relationship between each customer and their referred customers represents a network of potential sales representatives that are not employed by the financial institution. Instead, by providing reward benefits to a customer for brining in additional business, the rewards program in effect converts each new customer into a sales representative. This reduces costs to the financial institution providing the financial product because customers do not collect a salary or commission. Customer's benefit through increases to the amount of rewards they are eligible to receive, and a resulting increase in their attribution rate to the extent they accumulate the rewards through purchases. Previously referred customers may increase their amount of eligible rewards by referring additional customers.

At step 955, processing is performed to calculate a percentage of the invested amount, which is an amount of reward benefits available to the first customer. Each new customer is asked to inform the institution of any referral that led to the opening of the third-party's account. This information is communicated to and received by the computer system and stored in the database record for the associated account of the originating customer. At step 960, a percentage of all referred account values is added to the percentage of original account value eligible for rewards to establish the maximum amount. This maximum amount is reduced by a percentage of each transaction amount for which the credit card is used, and the remaining amount may be communicated back to the original customer to be viewed on a display or user interface. At step 965, processing is performed to calculate the reward benefit based on a total of two components, the total of the original account value and referral account value(s), and a percentage of the amount of a card transaction.

If at some time the account terminates or expires, the review of new accounts based on referral and the granting of reward benefits would also be terminated for the original account.

An example of an operation of an annuity debit card embodiment of the present invention, which is referred to as a Debit Card Annuity or DC Annuity, is illustrated using the table in FIGS. 10A and B. In the example of FIGS. 10A and B, it can be assumed that the Policyholder invests $100,000 premium at time zero with a crediting rate equal to 1%, of the current state minimum. The Policyholder is issued a credit card or debit card where the card is linked to the invested annuity account value.

In a preferred embodiment, the annuity has modest surrender charges in the first 5 years, for example, a surrender charge schedule may involve applying declining charges of 5%, 4%, 3%, 2%, and 1% prior to the 5th anniversary. At each 5-year anniversary, the policyholder may renew the annuity and, in a preferred embodiment, no new surrender charges apply. In other embodiments, a portion of the annuity may be withdrawn without a penalty or charge.

As apparent to one of ordinary skill in the art, the anniversary term and surrender charge schedule, as well as other example parameters described below, can be assigned or assume values to achieve other objectives in a preferred embodiment, such as deferring the amount of cash-back rewards to a policyholder in order to reward loyalty and persistence.

In the Debit Card Annuity example, debit card can have a debit card purchase rewards program, wherein the reward in year 't' is a function of 't,' where 't' is the amount of time the policyholder has owned the policy with the issuing company (commonly referred to as policy "persistency"), f(t), where f is the fraction of the current account value (AV) for which rewards are eligible and may depend upon time as well as other factors, r(t), where r(t) is the rebate percentage on purchases per unit of dollar purchased and which may also be a function of time as well as other quantities, and RAV, where RAV is the "referral account value" and is a function the number of referrals the policyholder has provided cumulatively since becoming a policyholder where such referrals resulted in the purchase of a policy, c(t) which is the percentage of RAV that may be subject to cash rebates, and s(t) which is the cash-back percentage applicable to the eligible RAV balance such that the product of RAV(t), s(t), and c(t), in a preferred embodiment, is the cash-back rewards in dollars in year t that is available to the policyholder based on his referral account value. Similarly, the product of AV(t), f(t), and r(t), provide the cash-back award in dollars available to the policyholder which is based on his own account value.

In a preferred embodiment, RAV(t) is the time-averaged account value of policies referred to the company by the policyholder. In another embodiment, the RAV may be adjusted to include an effect for persistency of the RAV, where greater persistency in a preferred embodiment may be additionally rewarded. The rewards may depend upon other parameters as well.

In a preferred embodiment, cash-back rewards are provided to the annuity debit card holder. When the card holder makes a purchase, a certain percentage of the purchase is rebated back to the debit card, and, optionally, that amount can be restored to the annuity balance. As an example, the cash-back reward in year t may be:

$$CB(t,AV,r,s,c)=g(t,AV(t),RAV(t),f(t),c(t),r(t),s(t))$$

Where, in a preferred embodiment, f(t) and r(t) are increasing functions of t. In another preferred embodiment; f(t) and r(t) may increase with t, at an increasing rate, i.e., be convex functions of t. c(t) is a multiplier which scales the referral balances upon which rewards are paid, and s(t) is a cash-back reward percentage applicable to c(f), which, in a preferred embodiment may also be in increasing function of time (to provide increasing rewards for the persistency of referral account values). Other formulas for rewards are possible and will be apparent to one of skill in the art.

As an example, consider the following AV of FIGS. 10A and B for the policyholder over a 20-year period, which assumes the minimum crediting rate of 1% (and also assumes that the policyholder is renewing the policy as needed depending upon the policy's terms, to remain a customer over the 20 years). In addition, in the next column to the right, the RAV or referral account values are shown which, in a preferred embodiment, are the annuity balances of other policyholders maintained with the company where such other policyholders were referred to the company by the first policyholder.

The first column of the table indicates that all cash flows occur at end of year. End of year "0" is the initial investment, which is the equivalent time of beginning of the first year. In the second column, for example, the account value ("AV") of the policyholder's annuity is $110,462 at the end of year 10 calculated assuming a crediting rate (a minimum allowable under state law, in a preferred embodiment, and currently 1%) is credited to the balance each year (assumed at the end of each annual period for simplicity).

As indicated earlier, column one is the end of year date of each cash flow or balance in the above table. AV, in the second column in the above table, is the account value of the annuity which reflects a 1% compounded crediting rate. RAV is the assumed referral account value equal to the balance of all annuities referred by the example policyholder under the DC Annuity.

The fourth column from the left in the above table, labeled f(t), is, in the example embodiment, the percentage of the AV in the same row (i.e., for a given year of age for the example policy) eligible for cash rebates or rewards. For example, in year 5, 12% of the AV of $105,101 can be spent and receive a reward. The next column to the right, c(t), is the amount of RAV that is eligible for reward. In the next column to the right, r(t) is the percentage cash back in year t that applies to a purchase with the DC Annuity card up to the eligible percentage of AV equal to f(t). For example, in year 5, when the DC Annuity owner makes purchases on her card worth 12% of her annuity balance of $105,101, she will receive cash back rewards of 2.5% (assuming she purchases the limit of 12% of $105,101 or $12,612, she will receive cash back of 2.5% of $12,612 or $315 as shown in the column "cb on AV" in year 5. A similar calculation applies to obtain the "cb on RAV" which is the product of RAV(t), c(t), and s(t) in the example embodiment. The total cash back rewards is the sum of "cb on AV" and "cb on RAV" in the above table. The column labeled "CR" is the amount of credited interest to the annuity per annum, which, in the example embodiment, credits at 1% per annum.

Of particular interest in the example embodiment is the column labeled "Pre Tax CF" which shows the pre-tax cash flows for the policyholder of the DC Annuity. This column shows an investment of $100,000 by the policyholder. The policyholder then receives the cash back rewards each year assuming the policyholder maximized his purchases on eligible AV and RAV, in year 20, the policyholder is assumed to withdraw the principal and accrued interest (compounded at 1%), together with receiving the final total cash back reward. Of interest is the pre-tax cash flow IRR on the cash back reward benefits and the 1% compounded crediting rate. To measure value of the merchant discounts, together with the value of the annuity returns, we employ the familiar concept of IRR. While IRR is typically used to find the yield on taxable cash flows, it can be used generically on non-taxable cash flows (e.g., those of nontaxable municipal bonds) or to measure value of projects. In the context of this patent, IRR is used in this generic sense to include non taxable cash flows, and does not imply anything including that the cash back cash flows are a "return" since in fact these cash flows are merchant discounts.

The next column shows that the IRR to the policyholder before tax (and to the issuing life company prior to tax) is equal to 4.72%. Importantly, however, the after-tax cash flows to the policy owner are equal to 4.5% as shown in the far right column. That is, the effective tax rate, which is equal to one minus the after-tax rate divided by the pre tax rate, is only 4.66%, whereas, in a traditional deferred annuity, the effective tax rate on benefits is equal (referring to the above example) to approximately 29.8%.

Another advantage of the debit card annuity preferred embodiment is the reduced cost of sales in the form of eliminating or greatly reducing commissions to life insurance agents. In a preferred embodiment what is sold to a customer is a debit card which is linked to a storage of value, which happens to be an annuity balance rather than a bank account. This sale is much simpler for the customer compared to the traditional and current art sale of a complicated annuity itself. Second, the benefits of the debit card annuity are much greater than that of the traditional annuity and, therefore, paying large compensation to sell the product is not necessary.

Another advantage of the debit card annuity preferred embodiment is the favorable relationship to the policyholder's after-tax return and the cost of the liability to the insurance company. The insurance company's after-tax cost of funds is shown below using the example from the table in FIGS. 10A and B:

| End of Year | Pre-Tax Insurer Cash Flows | After-Tax Insurer Cash Flows |
|---|---|---|
| 0 | $100,000 | $100,000 |
| 1 | $(76) | $301 |
| 2 | $(208) | $218 |
| 3 | $(400) | $97 |
| 4 | $(651) | $(63) |
| 5 | $(966) | $(263) |
| 6 | $(1,344) | $(506) |
| 7 | $(1,788) | $(791) |
| 8 | $(2,300) | $(1,120) |
| 9 | $(2,881) | $(1,494) |
| 10 | $(3,534) | $(1,914) |
| 11 | $(4,260) | $(2,383) |
| 12 | $(5,062) | $(2,900) |
| 13 | $(5,941) | $(3,467) |
| 14 | $(6,899) | $(4,086) |
| 15 | $(7,939) | $(4,758) |
| 16 | $(9,062) | $(5,484) |
| 17 | $(10,272) | $(6,266) |
| 18 | $(11,568) | $(7,105) |
| 19 | $(12,955) | $(8,002) |
| 20 | $(136,454) | $(130,979) |

Pre-tax cost of funds to insurer 4.72%
After-tax cost of funds to insurer 3.25%

The first column shows the pre-tax cost of the liability of the DC Annuity (crediting rate of 1% plus cash back rewards). The second column shows the after-tax cash flows recognizing that the insurer can deduct increases in reserves prior to any payment to the policyholder. As can be seen, the after-tax cost of the DC Annuity to the insurer is 3.25%. In the preferred example embodiment, the after-tax benefits to the policyholder are 4.5%, which is an advantage over current art costs of providing retirement and transaction benefits.

In a preferred embodiment, linking the debit card reward to referral balances also converts every customer into a networked sales representative, without, however, the restrictions and prohibitions imposed by agent licensing and commission anti-rebating laws.

In a preferred embodiment, the annuity debit card rewards are also linked to changes in CPI-U, so that future purchases are immunized against changes in inflation and taxation. In another preferred embodiment, the annuity debit card rewards are linked to unexpected changes in CPI-U so that future purchasing power is immunized against unexpected changes in inflation and also are free from tax.

In a preferred embodiment, any or all unused rewards in a given year may be carried over for use in future years. Optionally, these carried-over rewards may receive additional rewards to provide incentives for increases in policyholder policy persistence as well as greater deferred benefits to policyholders.

In an embodiment, a life insurance company issues its own branded credit card to deferred annuity, immediate annuity, or life insurance policyholders. A life insurance company links a debit card to a customers deferred annuity (variable or general account), immediate annuity, or life insurance policy. In either a debit card or credit card embodiment, the DC or CC will provide rewards upon the purchase of goods and services. The crediting rate of the life insurance company's policyholder's deferred annuity is maintained well below the market rate offered by other competitors. The crediting rate which is guaranteed by the company may be set to the statutory minimum. For products such as indexed annuities, which offer a crediting rate which is tied to the performance of an index such as the S&P 500, the life insurance company offers its customers smaller participation rates, lower caps, smaller income rider benefits, and otherwise significantly lower guarantees than its competitors. The total value of the accumulation phase is (1) the lower-than-market crediting rate and (2) rewards related to purchases made on the DC or CC. The DC or CC rewards may also be inflation-linked, for example, they will increase annually based upon the annual increases in the CPI-U index. The reward derived from consumption is inflation-linked and not taxable, whereas only the minimum crediting rate is taxable in a deferred ordinary manner. The result is an efficient after-tax, after-inflation, or real after-tax consumption stream provided to the policyholder.

If desired, in some embodiments, a fee-based rewards program can be implemented. For example, it can be structured such that a customer opens a card account and pays an upfront fee, an annual fee, or some other form of fee. The fee entitles the customer to certain rewards/points over a certain period of time. In this embodiment, there would be no inclusion of an associated annuity or financial account that is administered by the offering entity. The upfront fee is effectively "rebated" to the customer over time in the form of rewards (cash-back, points, etc.). A computer system can be implemented to structure this fee-based rewards program such as to receive and record the fee, administer the credit card account, issue rewards at the rate specified when the account was opened, and track eligible, available, or maximum rewards.

As already mentioned, in some preferred embodiments, the reward or the rate of reward could be greater than the percentage that the credit card company collects when payments are provided using the credit card as the form of payment (i.e., the interchange revenue).

In the illustrative embodiments, cash-back rewards can provide particular advantage as opposed to types of rewards issued as result of card usage. However, it is understood that the present embodiments are also applicable to other types of rewards.

A surety company optionally may be engaged to provide a guarantee that the reward benefits accrued by customers are delivered even if the financial institution administering the rewards program becomes financially incapable of honoring the acquired rewards. The surety is used to guarantee the rewards program of the credit card for customers of the insurance company and another form of insurance (if desired) can be used to guarantee the financial account.

Figure 11:
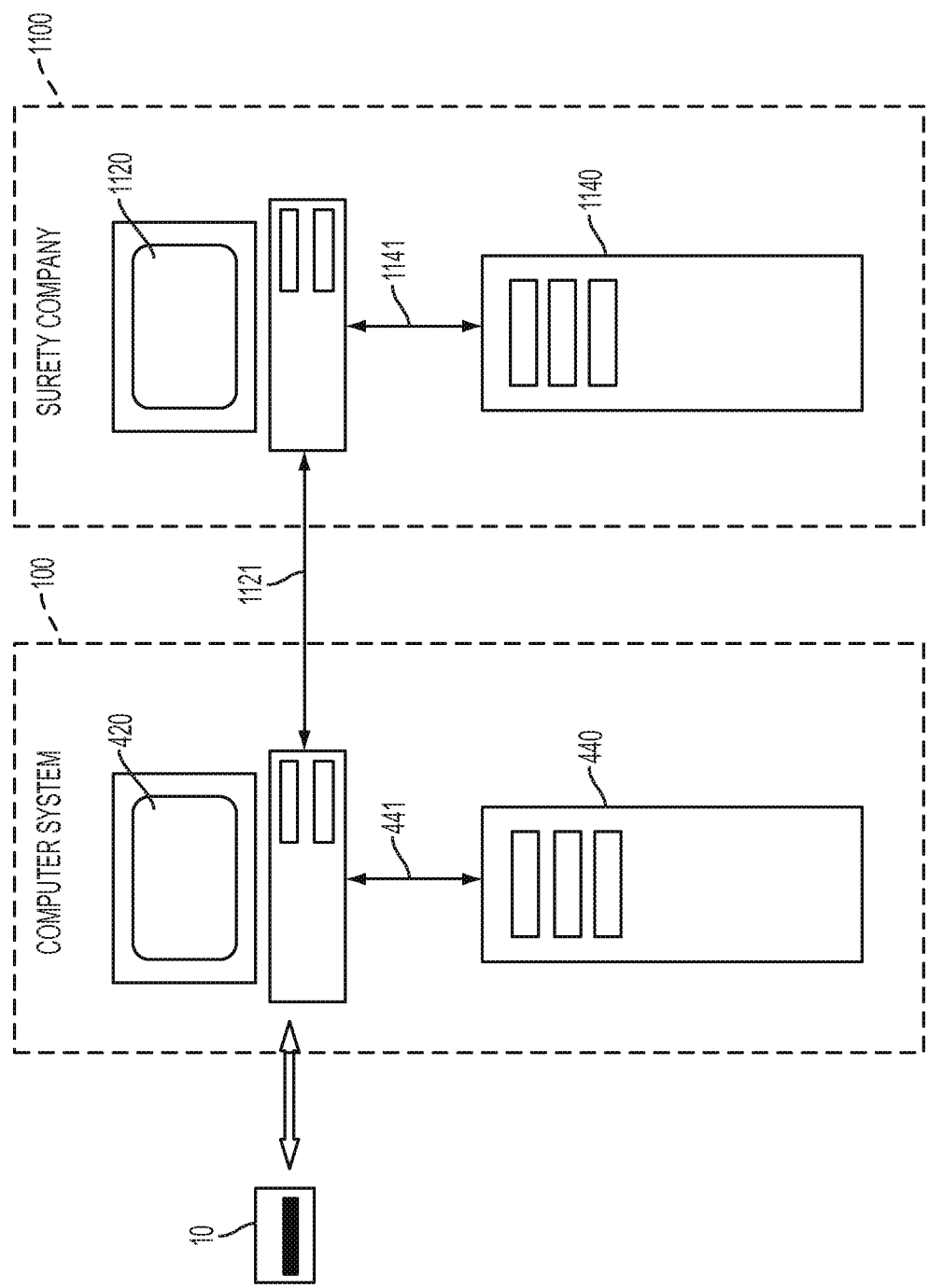
FIG. 11 is a high-level functional block diagram of a system and network for implementing a surety in accordance with one embodiment of the present invention.

With reference now to FIG. 11, computer system 100 can be the credit card or insurance company's computer system, which may comprise a computer 420 and database 440. Computer system 100 is configured to communicate over a line of communication 1121 with a surety company's computer system 1100, which may comprise a computer 1120 and database 1140. The surety company computer system 1100 receives transaction data from the use of customer credit cards 10 for purchases from the financial institution administering the credit cards. The computer system that administers or provides credit card services and/or operates the rewards program (e.g., issues rewards under the program) may be part of computer system 100. However, different arrangement also can exist, for example, arrangements in which an outside entity administers the credit card transactions and/or rewards program.

The surety company may be in communication with the computer system that administers the credit card usage or rewards programs, or possibly communicates with the insurance company's computer system (e.g., the systems that administer the financial account) directly or indirectly through other entities such as the credit card entity's computer system. Other arrangements of transmitting and receiving data between financial institutions that can provide the necessary data to the surety company are also contemplated. To acquire a guarantee on the rewards program, the data communication lines, databases, and computer systems are adapted to establish a surety relationship and exchange information and data necessary to establish the relationship between the insurance company, the computer system that administers the credit cards or reward program, the surety company's computer system, and the customers.

In some embodiments, the communications and computer interaction will be between the surety's computer system 1100 and the computer systems that administer the rewards program (maintains the rewards account, issues rewards, determines amount of rewards, etc.). If desired, the insurance company computer system 100 may receive the transaction data and transmit information and data relating to the amount of rewards earned by each customer for transactions during a particular accrual period to the surety company computer system 1100. The surety company's computer system 1100 may, in response, process the received data and calculate the amount of risk exposure the surety company has on the outstanding rewards owed by the rewards program to the insurance company's customers (the credit card users associated with the insurance product). The risk amount and fees may be communicated over communication line 1141 to database 1140 where the values may be stored. Various methods can be applied to determine the appropriate fee for providing the surety relationship including implementing a fee that is a function of eligible or available rewards. For example, the surety company may calculate the amount of fees necessary to guarantee the outstanding amount of rewards, and communicate this fee amount back to the insurance company computer for payment. If desired, the values associated with the rewards program may be updated as new transaction data is received or once during each accrual period.

Figure 12:
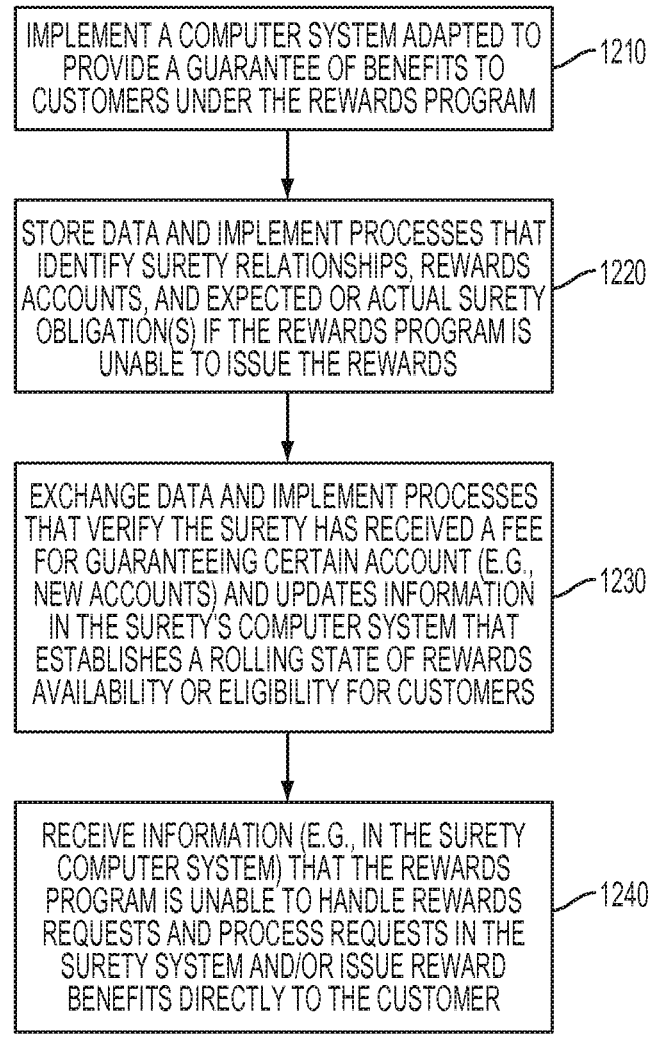
FIG. 12 is a flow chart that illustrates an example of implementing a guarantee as part of the reward program in accordance with an embodiment of the present invention.

A flow chart illustrating the implementation and processing for obtaining guarantee from a surety company on reward benefits is shown in FIG. 12. At step 1210 a computer system is adapted to provide a guarantee to customers enrolled in the rewards program for benefits accrued through the use of their credit cards. The computer system can be configured to receive and store data from other computer system(s) administering the credit cards and/or reward program, where the data can relate to the amount of rewards generated from purchases. The surety computer system may receive data when a customer uses her credit card for a transaction with a vendor.

At step 1220, the computer system stores received data and implements processes that identify surety relationships, rewards accounts, and expected or actual surety obligation if the rewards program is unable to issue the rewards. The surety relationships may include which reward benefits are to be covered by a guarantee, and the amount of risk exposure. At step 1230, data is exchanged between computer systems and processes are implemented to verify that the surety has received a fee for guaranteeing certain account (e.g., new accounts). Processes may also be implemented to update information in the surety's computer system that establishes a rolling state of rewards availability or eligibility for customers, so that recent transaction data is included in the system and new guarantee amounts are calculated. At step 1240, information may be received (e.g., at the surety computer system) that the rewards program is unable to handle rewards requests. Requests may be processed in the surety system and/or guaranteed reward benefits may be issued directly to the customer from merchants. The surety company may be requested to guarantee the entire amount of reward benefits accrued by the customer until she has been reimbursed by the reward program.

In other embodiments, the surety company calculates its amount of exposure resulting from the amount of rewards guaranteed for a particular period, and a fee to be charged for taking on the amount of risk. The surety company may transmits the fee(s), which is received, for example, by an insurance company computer system, and the insurance company stores the amount of the fee in the database for payment, where the payment may be communicated to the surety company along with the next request for guarantee of subsequent accrued reward amounts. The surety company's computer system receive and transmit data to the insurance company's computer system and credit card company's computer system to implement a guarantee for the rewards program under the credit card account. In this discussion, an insurance example was provided but its application to other areas is also contemplated.

A computer system (e.g., one or more computers) such as computer systems, network, or equipment described herein is configured to perform the illustrative method steps illustratively described herein by way of encoded computer executable software instructions.

Those of ordinary skill understand from the present description that the illustrative processes or steps described herein can be implemented in different sequences or orders if desired. Also, steps can be removed, modified, or added without varying from the scope and principles of the present invention.

At least one objective of embodiments of the present invention is to promote a deposit of funds as a saving or investment vehicle where the rights to withdraw invested funds would be restricted to prevent short terms withdrawal and to simultaneously provide current spending ability by way of a reward program with the use of a credit card or debit card (or similar instrument). The spending ability is preferably directly proportionate to (e.g., is a function of) the amount of invested funds.

One or more features illustratively described herein can be implemented individually or in various combinations. The present system, method, or related inventions also relate to a non-transient computer-readable medium configured to carry out any one of the methods disclosed herein or variations thereof. A software application(s) for carrying out the methods can be a set of instructions readable by a processor and stored on the non-transient computer-readable medium. Such medium may be permanent or semi-permanent memory, such as hard drive, floppy drive, optical disk, flash memory, ROM, EPROM, EEPROM, etc., as would be known to those of ordinary skill in the art.

The processes, steps, or methods illustratively described herein can be implemented using the described examples of hardware and network configurations.

It is understood that activity described from a user's perspective also encompasses the related features that are implemented on the system, platform, software, or process as part of providing that activity, operation, or interaction. The terms "adapted" or "configured" "implemented" indicate that software, hardware (including computer-readable), or combinations thereof are implemented by way of computer programs or circuitry to implement a particular structure or specialized computer system. If the terms are not specifically used, one of ordinary skill in the art will understand that it was contemplated in general or based on the specific context.

Transmission and reception of data or information can be between computers, databases, storage devices, or internal computer equipment is carried by transmitting electrical signals (e.g., carrying packets or messages) using computer equipment and are also carried by generating signals in response (e.g., consistent with the steps or processes described herein). A computer or computer system can be one or more computers. A network can also involve multiple networks.

The terms and expressions which have been employed in the specification are used as terms of description and not of limitations. There is no intention in the use of such terms and expressions to exclude any equivalents of the features shown and described or portions thereof, but it is recognized that various modifications are possible within the scope of the claims to the invention.

What is claimed is:

1. A computer system comprising:
a server computing device configured with software in non-transient memory to:
  receive data related to a request to issue a financial transaction credit card to a customer;
  receive data indicating investment of funds by customers into corresponding long term investment financial accounts for each customer, wherein the financial accounts are configured by a computer-implemented method as a long term saving vehicle selected by the customers for investment;
  capture, by a point-of-sale (POS) terminal, a first set of credit card transaction information associated with use of the issued credit cards by customers when the customers spend credit available on their corresponding cards, the first set of credit card transaction information captured when the corresponding card is physically presented to the POS terminal;
  capture, by a website, a second set of credit card transaction information associated with use of the issued credit cards by customers when the customers spend credit available on their corresponding cards, the second set of credit card transaction information captured when the corresponding card information is provided to the website via a remote computing device of the user;
  receive the first set of credit card transaction information from one or more remote computing systems that connect the POS terminal to the server computing device;
  receive the second set of credit card transaction information from one or more remote computing systems that connect the website to the server computing device;
  process the received transaction information, a value attribution rate, and a current account value underlying the financial accounts and in response generate one or more outputs representing current reward benefits that presently accrue to the customers that provide additional spending resources to the customers, wherein the processing comprises generating amounts of reward benefits as a form of value received upon spending by customers from the customers' use of their credit cards; and
  transmit information communicating the reward benefits currently available for consumption by customers,
wherein the process issues reward benefits for the customers' consumption, on the customer's financial transaction credit card, in response to the customers' use of their credit cards using the value attribution rate underlying the financial account, the value attribution rate based upon an untaxed reward benefits rate for the customer's financial transaction credit card and a taxed interest rate for funds deposited in the customer's financial account; and
wherein:
the server computing device comprising a credit card provider computing device and a financial institution computing device that divides the storage and administration of account information between the credit card provider computing device and the financial institution computing device, comprising:
the credit card provider computing device, separate from the financial institution computing device, creates, stores, and administers credit card accounts for the credit cards;
the financial institution computing device creates and administers the financial accounts and administers associated terms of rewards to be received from credit card usage based on individual financial accounts;
wherein the financial institution computing device instantiates a financial product on the server computing device, creates a database configured to implement an electronic structural relationship between the financial institution computer device and the credit card provider computing device, the electronic structure of the financial product comprising the long term investment account, the credit card account, the rewards component, and an electronic relationship between the long term investment account and the rewards component that controls the rewards component in connection with usage of the associated credit card, wherein the financial institution computing device is configured to administer the financial product in the financial accounts, process and store deposits into financial accounts, process the financial accounts by applying the value attribution rate to an amount on deposit in the financial account and in response generates a maximum eligible reward amount for each financial account as a function of the corresponding deposited amount, generate a percentage to be used for cash back rewards from the value attribution rate, and transmits, over a network, a rate of return or a percentage to be used for cash back rewards, and the maximum eligible cash back amount for corresponding credit cards to the credit card provider computing device; and wherein the credit card provider computing device receives financial values for the transaction information from credit card transactions from POS terminals, and receives and processes the rate of return or the percentage to be used for cash back reward, and the maximum eligible cash back amount, tracks financial values of transactions on the credit cards, in response, the credit card provider computing device authorizes and configures the credit card for that customer to issue rewards available as cash back on the credit card in accordance with the specified attribution rate for the financial product, and processes the financial values with the percentage for cash back rewards and in response, generates a cash back reward benefit, authorizes and configures the cash back reward benefit on the corresponding credit cards; accumulates the cash back reward benefit onto the credit cards for current use on the corresponding credit cards; and compares the cash back reward benefit to the maximum eligible reward amount and in response, prevents additional rewards from being available on the cards;

further wherein the server computing device processes received credit card transaction information and amounts on deposit in the financials account and generates two data streams from the processing, a first data stream comprising a deferred values stream applied to corresponding financial accounts and a second data stream comprising a current value stream from the reward benefits as a function of deposited amounts in the corresponding financial account and applied to current credit card transactions.

2. The computer system of claim 1, wherein the server computing device:

credits one of the financial accounts at a predetermined interest rate that is a minimum allowable interest rate under state laws, and updates a database to store a new amount for the one of the financial accounts.

3. The computer system of claim 1, wherein the server computing device:

provides a guarantee of benefits accrued to the customers under a rewards program from a surety computing device, wherein rewards benefit data relating to an amount of accrued reward benefits is communicated to the surety computing device and fee information for providing the guarantee of reward benefits is received from the surety computing device.

4. The computer system of claim 1, wherein the server computing device:

determines a maximum reward amount available during a specific time period as a percentage of the funds in The financial account, wherein the current reward benefit is subtracted from the maximum reward amount to determine a remaining reward benefit.

5. The computer system of claim 4, wherein the server computing device:

increases the percentage as a function of time that the customer maintains the financial account, thereby providing an increasing maximum reward amount over time.

6. The computer system of claim 4, wherein the server computing device:

discontinues the current reward benefit for the financial account when the remaining reward benefit reaches zero.

7. The computer system of claim 1, wherein the server computing device:

associates one or more third-party financial accounts with the financial transaction credit card;

determines the total account value of the one or more third-party financial accounts; and determines a percentage of the total of all third-party financial accounts to be eligible for reward benefits through use of the credit or debit card in making a purchase.

8. The computer system of claim 7, wherein the server computing device:

combines the percentage of the total of all third-party financial accounts to be eligible for reward benefits with the percentage of the amount of funds in the financial account eligible for reward benefits to increase a maximum reward amount available during a specific time period.

9. The computer system of claim 4 wherein the computer system implements and administers financial accounts that are annuity or life insurance accounts.

10. The computer system of claim 4, wherein the server computing device rolls over all or some of the remaining reward benefit to the another time period if less than the maximum reward amount available during the time period is consumed by the customer.

11. The computer system of claim 1, further comprising cooperatively administering, by the server computing device, the financial transaction credit cards.

12. The computer system of claim 1 wherein the operations further comprise cooperatively administering the financial transaction credit cards.

* * * * *